US012730404B2

(12) United States Patent
Wang et al.

(10) Patent No.: US 12,730,404 B2
(45) Date of Patent: Sep. 8, 2026

(54) RECORDING MATERIAL ESTIMATION METHOD, INFORMATION PROCESSING APPARATUS, AND CONSUMABLE

(71) Applicant: Zhuhai Pantum Electronics Co., Ltd., Zhuhai (CN)

(72) Inventors: Bo Wang, Zhuhai (CN); Hao Zhang, Zhuhai (CN); Dan Ning, Zhuhai (CN); Yi Tian, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/896,865

(22) Filed: Sep. 25, 2024

(65) Prior Publication Data

US 2025/0102985 A1 Mar. 27, 2025

(30) Foreign Application Priority Data

Sep. 26, 2023 (CN) ........................ 202311256350.X
Sep. 19, 2024 (CN) ........................ 202411313746.8

(51) Int. Cl.
*G03G 15/02* (2006.01)
*G03G 15/00* (2006.01)
*G03G 15/08* (2006.01)
*G06K 15/00* (2006.01)

(52) U.S. Cl.
CPC ....... *G03G 15/556* (2013.01); *G03G 15/0216* (2013.01); *G03G 15/0891* (2013.01); *G03G 15/5087* (2013.01); *G06K 15/4075* (2013.01)

(58) Field of Classification Search
CPC ............... G03G 15/553; G03G 15/556; G03G 15/5004; G03G 15/5079
See application file for complete search history.

(56) References Cited

U.S. PATENT DOCUMENTS 5,383,129 A 1/1995 Farrell
5,825,472 A 10/1998 Araki et al.
9,104,344 B2 * 8/2015 Ganesan .................... B41J 2/00
(Continued)

FOREIGN PATENT DOCUMENTS

JP 2021056289 A1 4/2021
WO 2015096652 7/2015

OTHER PUBLICATIONS

The European Patent Office (EPO) The Extended European Search Report for Application No. 24202790.2 Feb. 19, 2025 8 Pages.

*Primary Examiner* — Jessica L Eley
(74) *Attorney, Agent, or Firm* — Anova Law Group, PLLC

(57) ABSTRACT

The present disclosure provides a recording material estimation method, an information processing apparatus and a consumable. The method includes sending outputted page quantity messages respectively corresponding to n job types and first consumption messages of the recording material respectively corresponding to the n job types to the image-forming apparatus, where the outputted page quantity messages respectively corresponding to the n job types and the first consumption messages of the recording material respectively corresponding to the n job types are configured to determine a total consumption message of the recording material in a consumable; n is an integer greater than 1; and single-job outputted page quantities respectively corresponding to the n job types are different.

20 Claims, 7 Drawing Sheets

(56) References Cited

U.S. PATENT DOCUMENTS

| | | | |
|---|---|---|---|
| 2015/0277328 | A1 | 10/2015 | Koganehira et al. |
| 2016/0316082 | A1* | 10/2016 | Ishii .................. H04N 1/00068 |
| 2017/0134610 | A1 | 5/2017 | Stievenart et al. |
| 2019/0137922 | A1* | 5/2019 | Katsura ................ G03G 15/556 |
| 2019/0369541 | A1* | 12/2019 | Iida ...................... G03G 15/556 |
| 2020/0127821 | A1 | 4/2020 | Dolev et al. |
| 2022/0266599 | A1 | 8/2022 | Minamikawa et al. |

* cited by examiner

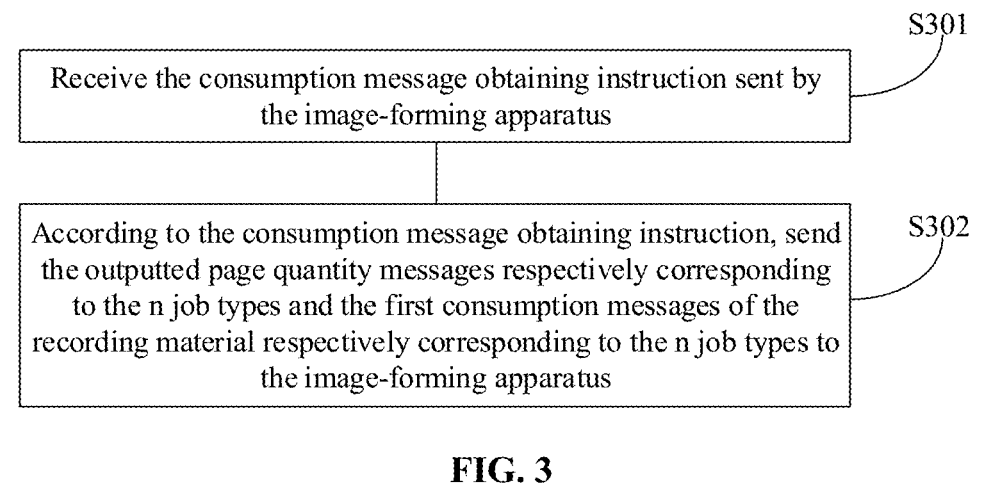

S301

Receive the consumption message obtaining instruction sent by the image-forming apparatus

S302

According to the consumption message obtaining instruction, send the outputted page quantity messages respectively corresponding to the n job types and the first consumption messages of the recording material respectively corresponding to the n job types to the image-forming apparatus

FIG. 3

Image-forming apparatus

Information processing apparatus

S401: obtain initial first consumption messages of recording material and initial outputted page quantity messages respectively corresponding to the n job types from information processing apparatus S402: obtain identification message of information processing apparatus S403: obtain outputted page quantity history messages and first consumption history messages of the recording material respectively corresponding to the n job types according to identification message of information processing apparatus S404: determine whether consumable chip meets expectations based on outputted page quantity history messages and initial outputted page quantity messages respectively corresponding to the n job types S405: determine whether information processing apparatus meets expectations based on first consumption history messages of recording material and initial first consumption history messages of recording material respectively corresponding to the n job types S406: after image-forming apparatus completes current output job, send page increment message corresponding to current output job and first consumption increment message of the recording material corresponding to current output job to information processing apparatus S407: determine first job type corresponding to page increment message according to received page increment message S408: obtain initial outputted page quantity message corresponding to first job type or associated message of initial outputted page quantity message S409: obtain initial first consumption message of recording material corresponding to first job type or associated message of initial first consumption message S410: determine outputted page quantity message corresponding to first job type according to received page number increment message S411: determine first consumption message of recording material corresponding to first job type according to first consumption increment message S412: after completing current output job, obtain first consumption message of recording material respectively corresponding to the n job types from consumable chip S413: after completing current output job, obtain outputted page quantity message respectively corresponding to the n job types from consumable chip S414: determine whether information processing apparatus meets expectation

FIG. 4

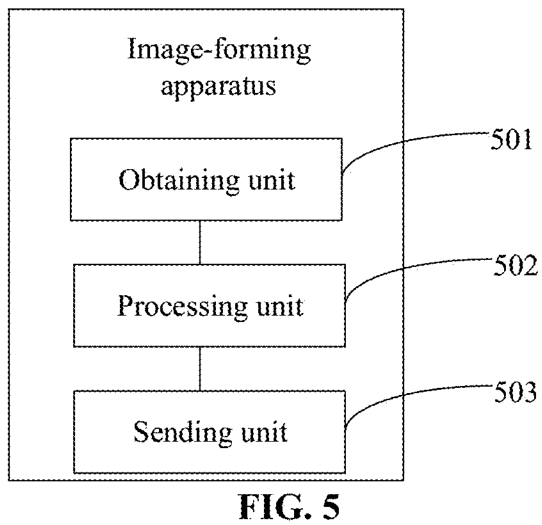
FIG. 5
Consumable
Housing
Information processing apparatus
Developer accommodating portion
FIG. 6
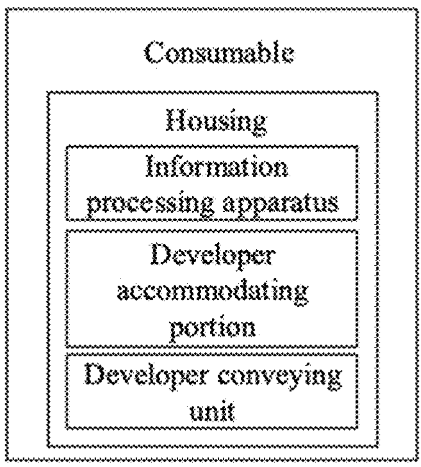
FIG. 7

RECORDING MATERIAL ESTIMATION METHOD, INFORMATION PROCESSING APPARATUS, AND CONSUMABLE

CROSS-REFERENCE TO RELATED APPLICATION

The present disclosure claims the priority to Chinese patent application No. 202311256350.X, filed on Sep. 26, 2023, and No. 202411313746.8, filed on Sep. 19, 2024, the entirety of all of which is incorporated herein by reference.

TECHNICAL FIELD

The present disclosure generally relates to the field of printing technology and, more particularly, relates to a recording material estimation method, an information processing apparatus, and a consumable.

BACKGROUND

An image-forming apparatus is a device that forms images on a recording medium through image-forming principle, such as a printer, a copier, a fax machine, a multifunctional image making and copying device, an electrostatic printing device, and/or any other similar device. The image-forming apparatus may be detachably provided with consumables, and the consumables may provide recording materials in the image-forming process of the image-forming apparatus. For example, for a laser printer, corresponding consumable may be a process cartridge, and the recording material in the process cartridge may be carbon toner; for an inkjet printer, corresponding consumable may be an ink cartridge, and the recording material in the ink cartridge may be ink toner or ink.

In order to facilitate consumable management, consumable chips may be provided on the consumables. When the consumable is installed in the image-forming apparatus, the consumable chip may exchange information with the image-forming apparatus. Remaining consumable amount data is one of the key data of the consumables, which is configured to indicate the remaining amount or remaining proportion of the recording materials in the consumables.

In the existing technology, the recording material consumption amount used for printing a fixed single page may be configured to estimate the recording material consumption amount for the consumable. For example, based on past overall experience, the average amount of the recording material consumed for printing one page is “a” grams. Then, the recording material consumption amount for a single page during printing may be directly set to be “a” grams. Therefore, printing one page may consume “a” grams of the recording material; printing 10 pages may consume “10a” grams of the recording material; printing 100 pages may consume “100a” grams of the recording material, and so on. However, such estimation method may easily cause relatively large error, resulting in bad user experience.

SUMMARY

One aspect of the present disclosure provides a recording material estimation method. The method includes sending outputted page quantity messages respectively corresponding to n job types and first consumption messages of the recording material respectively corresponding to the n job types to the image-forming apparatus, where the outputted page quantity messages respectively corresponding to the n job types and the first consumption messages of the recording material respectively corresponding to the n job types are configured to determine a total consumption message of the recording material in a consumable; n is an integer greater than 1; and single-job outputted page quantities respectively corresponding to the n job types are different.

Another aspect of the present disclosure provides an information processing apparatus. The information processing apparatus includes a first sending module, configured to send outputted page quantity messages respectively corresponding to n job types and first consumption messages of the recording material respectively corresponding to the n job types to the image-forming apparatus, where the outputted page quantity messages respectively corresponding to the n job types and the first consumption messages of the recording material respectively corresponding to the n job types are configured to determine a total consumption message of the recording material in a consumable; n is an integer greater than 1; and single-job outputted page quantities respectively corresponding to the n job types are different.

Another aspect of the present disclosure provides a consumable, including a housing; a developer accommodating portion in the housing and configured to accommodate a developer; and the information processing apparatus according to any above-mentioned embodiments.

Another aspect of the present disclosure provides a consumable, including a photosensitive drum; a developing roller, configured to charge the photosensitive drum; and the consumable chip according to any above-mentioned embodiments.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

FIG. 3 illustrates another flowchart of an estimation method of a recording material provided by exemplary embodiments of the present disclosure.

FIG. 4 illustrates another flowchart of an estimation method of a recording material provided by exemplary embodiments of the present disclosure.

FIG. 5 illustrates another structural schematic of an image-forming apparatus provided by exemplary embodiments of the present disclosure.

FIG. 6 illustrates a structural schematic of a consumable.

FIG. 7 illustrates another structural schematic of a consumable.

DETAILED DESCRIPTION

Figure 1A:
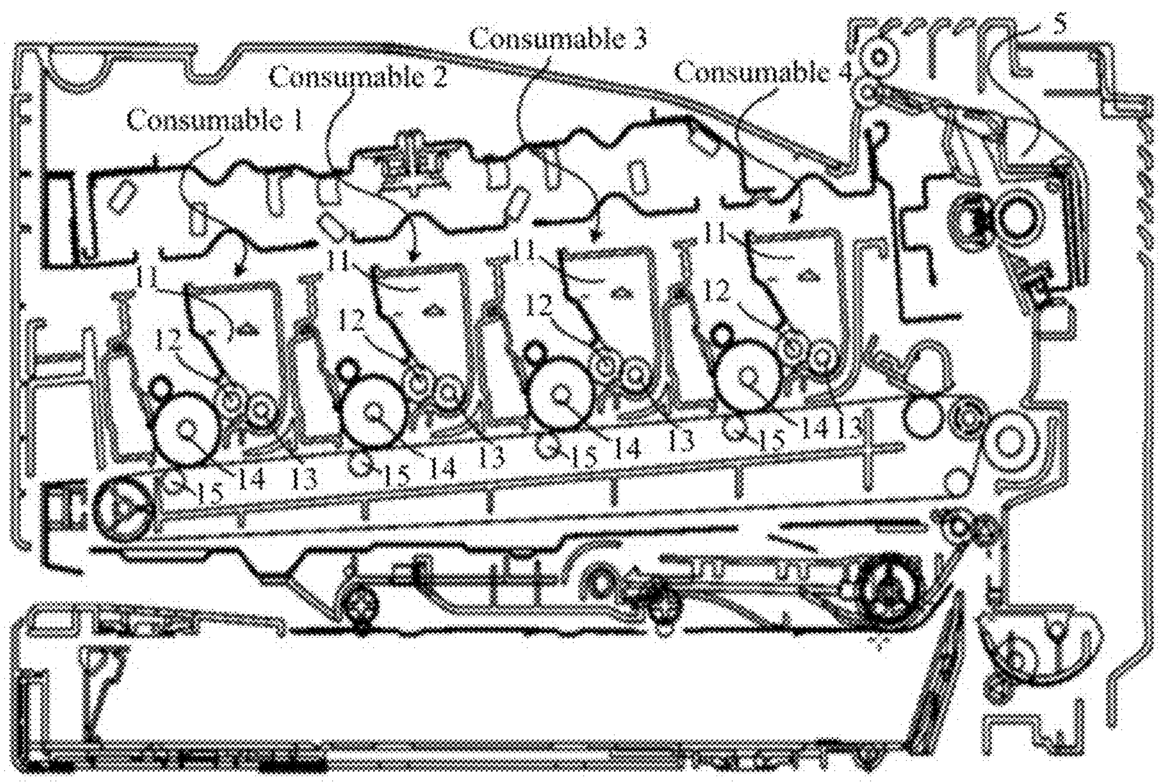
FIG. 1A illustrates a structural schematic of an image-forming apparatus provided by exemplary embodiments of the present disclosure.

In order to better understand the technical solutions of the present disclosure, embodiments of the present disclosure are described in detail below with reference to accompanying drawings.

It should be understood that described embodiments are only some of embodiments of the present disclosure, rather than all of embodiments. According to embodiments in present disclosure, all other embodiments obtained by those skilled in the art without making creative efforts should fall in the protection scope of present disclosure.

The terms used in embodiments of the present disclosure are only for the purpose of describing specific embodiments and not intended to limit the present disclosure. As used in embodiments and appended claims, the singular forms "a," "the" and "said" are also intended to include plural forms, unless the context clearly dictates otherwise.

It should be understood that the term "and/or" used in the present disclosure is only an association relationship describing related objects, indicating that there may be three relationships. For example, A and/or B may indicate three cases: A alone, both A and B, and B alone. In addition, the character "/" in the present disclosure indicate that related objects are an "or" relationship.

In order to facilitate consumable management, consumables may be used in conjunction with information processing apparatus. When the consumable is installed in the image-forming apparatus, the information processing apparatus may exchange information with the image-forming apparatus. Remaining consumable amount data is one of the key data of the consumables, which is configured to indicate the remaining amount or remaining proportion of the recording materials in the consumables.

In the existing technology, the recording material consumption amount used for printing a fixed single page may be configured to estimate the recording material consumption amount for the consumable. For example, based on past overall experience, the average amount of the recording material consumed for printing one page is "a" grams. Then, the recording material consumption amount for a single page during printing may be directly set to be "a" grams. Therefore, printing one page may consume "a" grams of the recording material; printing 10 pages may consume "10a" grams of the recording material; printing 100 pages may consume "100a" grams of the recording material, and so on. However, such estimation method may easily cause relatively large error, resulting in bad user experience.

In order to solve above-mentioned problems, in embodiments of the present disclosure, the first consumption messages of the recording material respectively corresponding to n job types may be obtained from the information processing apparatus, where the first consumption messages of the recording material respectively corresponding to the n job types may be the consumption amount messages of the recording material consumed by outputted pages of corresponding job types; the second consumption messages of the recording material respectively corresponding to the n job types may be obtained; and the total consumption message of the recording material may be determined according to the first consumption messages of the recording material respectively corresponding to the n job types and the second consumption messages of the recording material respectively corresponding to the n job types. That is, in embodiments of the present disclosure, when estimation of the recording material is needed, the first consumption messages of the recording material respectively corresponding to the n job types may be obtained from the consumable chip; and the first consumption messages may be the consumption amount messages of the recording material consumed by outputted pages corresponding to the n job types. The recording material may not only be consumed when the print job is performed but also be consumed due to events, including OPC idling when the main control motor starts preheating before printing job, OPC idling generated by switching pages during job printing, and OPC idling before the main control motor stops when current job printing is completed. Therefore, in embodiments of the present disclosure, it needs not only to obtain the first consumption messages of the recording material respectively corresponding to the n job types, but also to obtain the second consumption messages of the recording material respectively corresponding to the n job types. The second consumption messages refer to the consumption amount messages of the recording material consumed respectively corresponding to the n job types except the recording material consumed by the outputted pages. Based on the first consumption messages and the second consumption messages of the recording material respectively corresponding to the obtained n job types, the total consumption message of the recording material in the consumable may be determined. That is, in embodiments of the present disclosure, when determining the consumption message of the recording material, it needs not only to determine the consumption amounts of the recording material consumed by the outputted page quantity corresponding to the n job types, but also to determine the second consumption messages respectively corresponding to the n job types, thereby improving the accuracy of the evaluation result of final total consumption amount of the recording material and improving the user experience. In addition, in embodiments of the present disclosure, printed page quantity messages respectively corresponding to various job types may be counted, and additional consumption amounts of the recording material respectively corresponding to various job types except the consumption amount of the recording material consumed by the outputted pages may be calculated and recorded. The additional consumption amount of the recording material obtained by calculation may be more accurate, which may improve the accuracy of the evaluation result of final consumption amount of the recording material and further improve the user experience.

In embodiments of the present disclosure, the image-forming apparatus may be configured to perform image-forming operations, such as generating, printing, receiving and sending image data. In addition, examples of image-forming apparatuses may include inkjet printers, laser printers, LED (light-emitting diode) printers, copiers, scanners or multifunction fax machines, and multifunction peripherals (MFPs) that perform above functions in a single device. The image-forming apparatus may include an image-forming control unit and an image-forming unit. The image-forming control unit may be configured to control the image-forming apparatus as a whole. The image-forming unit may be configured to form images on conveyed paper under the control of the image-forming control unit based on the image-forming data and the developer (such as toner) stored in the consumables.

The image-forming control portion may be a system on chip (SoC). SoC is a miniature system including multiple system components, which may be configured to control the image-forming processing operations of the image-forming apparatus, for example, perform linear correction, noise reduction, bad pixel removal, detail enhancement and other processing, thereby improving the quality of the image output. The image-forming control portion may be also configured to perform processing operations related to data transmission and reception, command transmission and reception, and engine control of printing images, for example, transmit and receive data, print engine control commands, status and the like through an interface unit (including but not limited to a USB port, a wired network port, a wireless network port, or other interfaces).

FIG. 1A illustrates a structural schematic of an image-forming apparatus provided by exemplary embodiments of the present disclosure. Referring to FIG. 1A, as an example of the image-forming apparatus, the image-forming unit of the image-forming apparatus may include a developer accommodating portion 11, a developing part 12, a developer conveying unit 13, a photosensitive part 14, a transferring part 15 and a fixing assembly 5 and the like. The paper to be printed may move along the paper conveying direction, and after the toner feeding operation of the developer conveying unit 13 and the developing operation of the developing part 12, the paper to be printed may reach the clamping area between the photosensitive part 14 and the transferring part 15 for transferring and may be fixed through the fixing assembly 5 to complete the image-forming operation.

The developer accommodating portion 11 may be configured to contain the developer; and the developer may be a material such as color toner and carbon toner. The photosensitive part 14 may include a photosensitive drum (OPC, organic photoconductor), a charging roller and the like; and the charging roller may be configured to charge the photosensitive drum of the developing part. The developing part 12 may include components such as a developing roller and the like, which may be configured to convey the developer to the photosensitive part 14. The developer conveying unit 13 may include units such as a toner feeding roller and the like or may be replaced by units such as a toner pushing screw and the like, for conveying the developer to the developing part 12.

The image-forming apparatus may be detachably installed with at least one consumable. Taking the image-forming apparatus shown in FIG. 1A as an example, the image-forming apparatus may be detachably installed with four consumables (consumable 1, consumable 2, consumable 3 and consumable 4 shown in FIG. 1A, respectively; and four consumables may be configured to provide the image-forming apparatus with four colors of developers, that is, black K, cyan C, magenta M, and yellow Y). Obviously, in other embodiments, the quantity of consumables installed in the image-forming apparatus may be increased or decreased, for example, 1, 6 or the like, which may not be limited in the present disclosure.

In an optional implementation manner, the consumable may only include the developer accommodating portion 11.

In an optional implementation manner, the consumable may be a split structure. For example, the consumable (1, 2, 3 or 4) may include a developing cartridge and a drum cartridge that may be detached from each other. The developing cartridge may include a housing, the developer accommodating portion 11, the developing part 12, and the developer conveying unit 13; and the drum cartridge may include the photosensitive part 14, that is, include the photosensitive drum and the charging roller.

The developer accommodating portion 11 may be in the housing and configured to contain the developer. The developer conveying unit 13 may be configured to convey the developer to the developing part 12. The developing part 12 may be configured to convey the developer to the photosensitive drum. In addition to being the toner feeding roller, the developer conveying unit may also be other components such as a toner pushing screw.

In an optional implementation manner, the consumable may be above-mentioned developing cartridge.

In an optional implementation manner, the consumable may be above-mentioned drum cartridge.

In an optional implementation manner, the consumable may be an integrated structure, for example, the consumable (1, 2, 3 or 4) may include the developer accommodating portion 11, the developing part 12, the developer conveying unit 13, the photosensitive part 14 and the like.

It should be noted that the consumables mentioned in one embodiment may also be other components, parts, and units in the image-forming apparatus that are easily damaged and need to be replaced, such as paper boxes or the like, which may also belong to the technical solutions corresponding to the consumables protected by the present disclosure.

In order to facilitate consumable management, the consumable may be used in conjunction with the consumable chip; and the consumable chip may be an electronic device with storage function. The consumable chip may also include other components that can be used for information processing, including a first controller (e.g., a microcontroller unit (MCU)). In one embodiment, the consumable chip may be installed on the consumable. The consumable chip may be installed on the consumable before the consumable is shipped, or installed on the consumable by the user after the consumable is shipped. In another embodiment, the consumable chip may not need to be installed on the consumable but may be fixed to the image-forming apparatus by an installation part or adhesive. When the consumable is used by the image-forming apparatus, the contacts of the consumable chip may be in electrical contact with the contact terminals corresponding to the image-forming apparatus, thereby realizing the electrical connection between the consumable chip and the image-forming apparatus. When the consumable is not used by the image-forming apparatus (the consumable is not in working state, for example, when the consumable is installed in the image-forming apparatus but not used, or when the consumable is removed from the image-forming apparatus), the contacts of the consumable chip may or may not be in contact with the contact terminals corresponding to the image-forming apparatus. It should be noted that when the consumable is above-mentioned split structure including the drum cartridge and the developing cartridge that are detachable from each other, the drum cartridge and the developing cartridge may be equipped with consumable chips respectively.

In some possible implementations, the information processing apparatus described in embodiments of the present application may be a consumable chip or a consumable chip set. The consumable chip may be, for example, a circuit substrate mounted on the consumable; the circuit substrate may include a storage device, and an electrical contact portion connected to the storage device; the electrical contact portion may be configured to be connected to an electrical contact portion on the side of the image-forming apparatus; and the electrical contact portion may be a conductive plane, a conductive probe, a conductive coil or the like.

In one embodiment, the consumable chip of embodiments of the present disclosure may include a substrate and a plurality of contacts. The plurality of contacts may be arranged on the substrate. The plurality of contacts may be configured to electrically connect with a plurality of contact terminals arranged on the image-forming apparatus respectively, thereby realizing communication between the image-forming apparatus and the consumable chip. The plurality of contacts may include VCC contacts, GND contacts, SDA contacts, and SCL contacts.

In another embodiment, the consumable chip in embodiments of the present disclosure may further include a connecting plate in addition to the substrate, where the connecting plate may be electrically connected to the substrate, and at least a part of above-mentioned plurality of contacts may be arranged on the connecting plate. For the consumable for installing the chip.

Figure 1B:
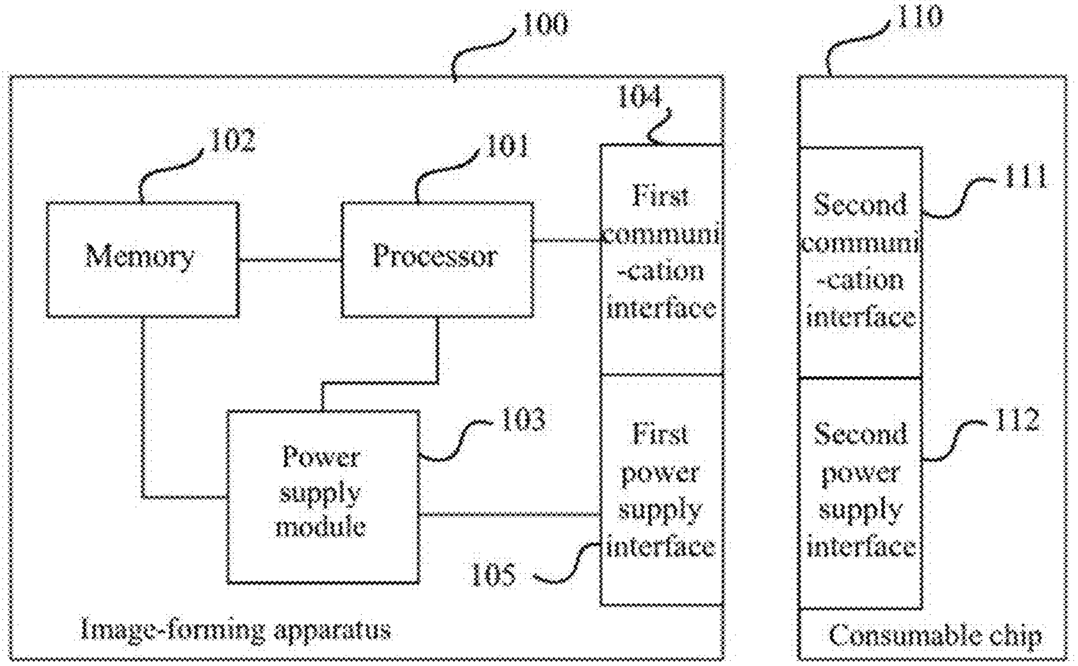
FIG. 1B illustrates a schematic diagram of the connection relationship between a consumable chip and an image-forming apparatus provided by exemplary embodiments of the present disclosure.

FIG. 1B illustrates another structural schematic of an image-forming apparatus provided by exemplary embodiments of the present disclosure. The image-forming apparatus 100 may include a processor 101, a memory 102, a power supply module 103, a first communication interface 104, and a first power supply interface 105.

It should be understood that the image-forming apparatus provided in embodiments of the present disclosure may not specifically limit the image-forming apparatus. In some embodiments, the image-forming apparatus may include more or fewer components than the structure shown in FIG. 1B, which may be not limited in embodiments of the present disclosure.

The memory 102 may be configured to store computer programs, and the processor 101 may call and run computer programs from the memory 102.

The processor 101 may include the SoC used as the image-forming control unit mentioned above and may further include one or more interfaces. The interfaces may include an inter-integrated circuit (I2C) interface. The I2C interface may be a bidirectional synchronous serial bus, including a serial data line (SDA) and a serial clock line (SCL). In some embodiments, the processor 101 may include multiple groups of I2C buses.

The first communication interface 104 may be connected to corresponding interface of the processor 101. For example, if the first communication interface 104 is an I2C interface, the first communication interface 104 may be connected to the I2C interface included in the processor 101.

The power supply module 103 may be connected to the processor 101, the memory 102, and the first power supply interface 105, respectively. The power supply module 103 may receive power input to supply power to above-mentioned parts.

Optionally, the power input of the power supply module 103 may be the mains power received by the power plug of the image-forming apparatus, such as 220V AC power. The power supply module 103 may convert the AC power into the DC power required by the parts including the processor 101, the memory 102, the first power supply interface 105 and the like, thereby supplying power to above-mentioned parts.

The first communication interface 104 and the first power supply interface 105 may be configured at the consumable installation position of the image-forming apparatus 100 for coupling the consumable chip.

As shown in FIG. 1B, the consumable chip 110 may include a second communication interface 111 and a second power supply interface 112.

It should be noted that FIG. 1B may only show the second communication interface 111 and the second power supply interface 112 of the consumable chip 110 connected to the image-forming apparatus 100, which may illustrate optional connection relationship between the consumable chip and the image-forming apparatus 100 and may not limit specific implementation structure of the consumable chip. The consumable chip 110 may further include other parts such as a control unit (e.g., a microcontroller unit (MCU)) and the like, which may refer to the consumable chip provided in subsequent embodiments of the present disclosure and may not be described in detail herein.

In one embodiment, the consumable chip 110 may be configured on the consumable of the image-forming apparatus 100. When the consumable is installed at the installation position set by the image-forming apparatus 100 for such consumable, the consumable chip 110 may be coupled with the image-forming apparatus 100. For example, the second communication interface 111 of the consumable chip 110 may be electrically connected to the first communication interface 104 of the image-forming apparatus 100, thereby being electrically connected to the processor 101 of the image-forming apparatus 100 through the first communication interface 104. In one example, the first communication interface 104 and the second communication interface 111 may be I2C interfaces respectively. The second power supply interface 112 of the consumable chip 110 may be electrically connected to the first power supply interface 105 of the image-forming apparatus 100, such that the image-forming apparatus 100 may supply power to the consumable chip 110 through the first power supply interface 105 and the second power supply interface 112.

Figure 1C:
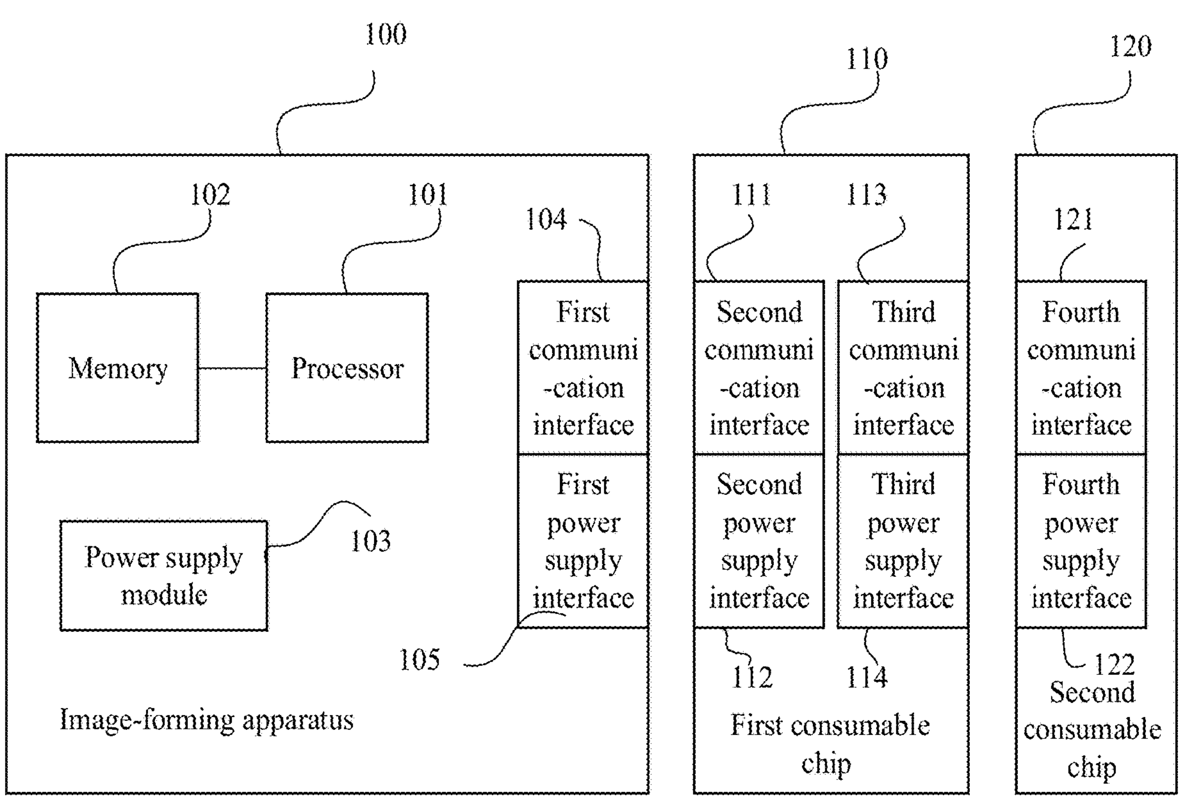
FIG. 1C illustrates another schematic diagram of the connection relationship between a consumable chip and an image-forming apparatus provided by exemplary embodiments of the present disclosure.

In another embodiment, the consumable chip 110 is used as the first consumable chip 110, the first consumable chip 110 and the second consumable chip 120 may form a chipset, as shown in FIG. 1C, the first consumable chip 110 may be also electrically connected to a second consumable chip 120; and the first consumable chip 110 and the second consumable chip 120 may communicate with each other. When the image-forming apparatus 100 communicates with the first consumable chip 110, the image-forming apparatus 100 may act as a host to send instructions to the first consumable chip 110, and the first consumable chip 110 may act as a slave to respond to the instructions sent by the host. When the first consumable chip 110 communicates with the second consumable chip 120, the first consumable chip 110 may act as a host to send instructions to the second consumable chip 120, and the second consumable chip 120 may act as a slave to respond to the instructions sent by the first consumable chip 110. The instructions sent by the first consumable chip 110 to the second consumable chip 120 may be generated by the first consumable chip 110, or the first consumable chip 110 may forward the instructions sent by the image-forming apparatus 100. At this point, the first consumable chip 110 may determine which part should process the instructions sent by the image-forming apparatus 100. When it is determined that the instructions should be processed by the second consumable chip 120, the instructions may be forwarded to the second consumable chip 120. The third communication interface 113 of the first consumable chip 110 may be electrically connected to the fourth communication interface 121 of the second consumable chip

120. In one embodiment, the third communication interface 113 and the fourth communication interface 121 mentioned above may be wired communication interfaces (for example, I2C interfaces), or optical, infrared or other appropriate information transmission path interfaces. In some embodiments, a switch controlled by the first consumable chip may be disposed in the communication link between the first consumable chip and the image-forming apparatus. When the first consumable chip determines that the first consumable chip needs to communicate with the image-forming apparatus at current stage, the communication link between the first consumable chip and the image-forming apparatus may be connected by the switch, or the communication link between the first consumable chip and the image-forming apparatus may be kept connected. When the first consumable chip determines that the second consumable chip needs to communicate with the image-forming apparatus at current stage, the communication link between the second consumable chip and the image-forming apparatus may be connected through the switch. When the first consumable chip determines that the second consumable chip does not need to communicate with the image-forming apparatus at current stage, the communication link between the second consumable chip and the image-forming apparatus may be disconnected by the switch. The information processing apparatus described in embodiments of the present application may include a chipset, including the first consumable chip 110 and the second consumable chip 120.

In some possible implementations, the information processing apparatus described in the present application includes the aforementioned consumable chip or consumable chipset, and an auxiliary circuit module. The consumable chip may be connected to the auxiliary circuit module, and may be connected through a wired communication interface, or may be connected through an optical, infrared or other appropriate information transmission path interface. The auxiliary circuit module is used to implement some functions of the consumable chip, or additional functions. The auxiliary circuit may respond to the indication of the consumable chip or be enabled by a signal other than the instruction of the consumable chip, to provide the consumable chip or the main device with corresponding data information or waveform information and other information. The auxiliary circuit module may include logic units such as AND gates, OR gates, NOT gates, triggers, etc., and may also include circuit units of devices such as FPGA, MCU, DSP, etc. Those skilled in the art can design the auxiliary circuit module according to actual needs. The composition and specific functions of the auxiliary circuit module may not be limited in the present disclosure.

It should be noted that when the image-forming apparatus install multiple consumables, each consumable may be equipped with an information processing apparatus, or only some of the consumables may be equipped with an information processing apparatus. In other words, the relationship between the consumables and the information processing apparatus may be one-to-one. For example, if the image-forming apparatus install six consumables, each of the six consumables may be equipped with its own information processing apparatus. The relationship between the consumables and the information processing apparatus may also be one-to-many. For instance, if the image-forming apparatus install six consumables, one of the consumables may be equipped with an information processing apparatus that handles information for all six consumables and the image-forming apparatus. For example, this information processing apparatus may store information corresponding to all six consumables, provide the image-forming apparatus with information related to the six consumables, or receive information corresponding to the six consumables sent by the image-forming apparatus.

In embodiments of the present disclosure, the calculation of the total consumption message of the recording material in the consumable may occur after the execution of each job is completed. That is, after current job output is completed, the cumulative consumption amount message of the recording material respectively corresponding to the n job types and the cumulative outputted page quantity messages respectively corresponding to the n job types may need to be updated according to the execution status of current job. For the sake of distinction, the cumulative consumption amount message of the recording material respectively corresponding to the n job types provided by the consumable chip before the update refers to “initial first consumption messages”; the cumulative outputted page quantity messages respectively corresponding to the n job types provided by the consumable chip before the update refers to “initial outputted page quantity message”; the cumulative outputted page quantity messages respectively corresponding to the n job types provided by the consumable chip after the update refers to “outputted page quantity message”, and the cumulative consumption amount message of the recording material respectively corresponding to the n job types provided by the consumable chip after the update refers to “the first consumption messages”.

It should be noted that above-mentioned cumulative consumption amount message of the recording material respectively corresponding to the n job types refers to, for example, the cumulative consumption amount message of the recording material in the consumable up to the present in the lifespan of the consumable; and above-mentioned cumulative outputted page quantity messages respectively corresponding to the n job types refers to, for example, the cumulative printed-outputted page quantity when the consumable is used for image formation up to the present in the lifespan of the consumable. The complete lifespan of consumable refers to the process from the consumable leaving the factory to the recording material in the consumable being consumed until remaining amount is lower than a preset value. When the recording material in the consumable is consumed until the remaining amount is lower than the preset value, it may be considered that the recording material in the consumable has been exhausted. Current output job refers to the process that at least one main control motor in the image-forming apparatus is from start-up to stop rotating and prints out at least one page of the image when there is a job to be printed in the image-forming apparatus. The main control motor may be configured to drive at least a part of the assemblies (components) in above-mentioned image-forming unit to rotate. Above-mentioned job to be printed may be a job to be printed newly received by the image-forming apparatus or may be an unfinished part of previous print task, which may not be limited in the present disclosure.

Figure 2:
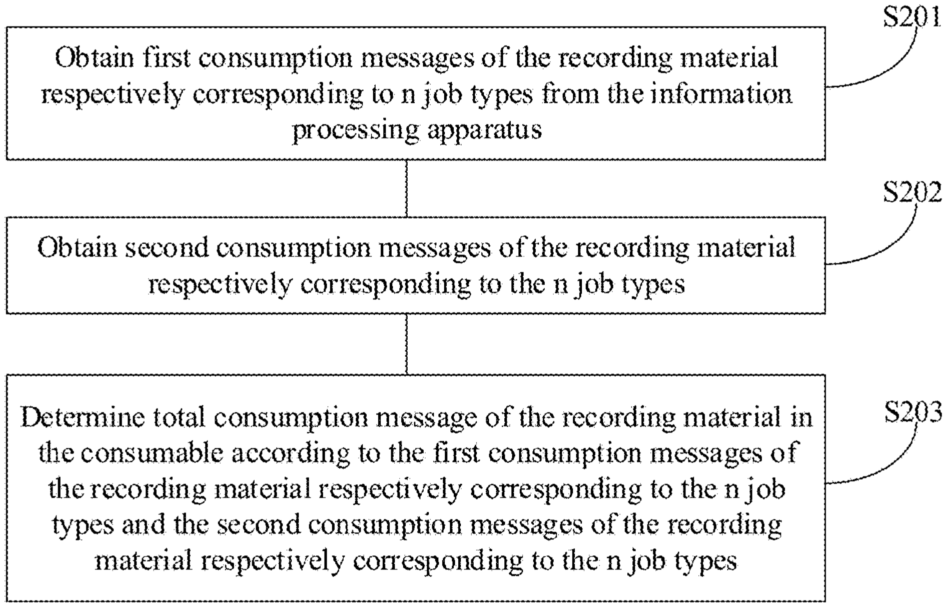
FIG. 2 illustrates a flowchart of an estimation method of a recording material provided by exemplary embodiments of the present disclosure.

FIG. 2 illustrates a flowchart of an estimation method of a recording material provided by exemplary embodiments of the present disclosure. Above-mentioned method may be applied to the image-forming apparatus shown in FIG. 1A and FIG. 1B. At least one consumable may be detachably installed in the image-forming apparatus. The image-forming apparatus can communicate with the information processing apparatus of the consumable. The relationship between the consumables and the information processing apparatus may be one-to-one or many-to-one. As shown in FIG. 2, the method may include the following exemplary steps.

At S201, the first consumption messages of the recording material respectively corresponding to n job types may be obtained from the information processing apparatus.

The first consumption messages may be configured to determine the consumption amount message of the recording material consumed by the outputted page quantity of corresponding job types.

The first consumption messages may be directly the consumption amount message of the recording material consumed by the quantity of outputted pages of corresponding job types. For example, the first consumption messages may be the cumulative points of the recording material consumed by the images formed in the outputted pages, or the cumulative mass (unit: mg) of the recording material consumed by the images formed in the outputted pages, or the calculation factor of the consumption amount message of the recording material consumed by the outputted pages of corresponding job types. That is, the first consumption messages of the recording material may be configured to calculate the consumption amount message of the recording material consumed by the quantity of outputted (generated) pages of corresponding job types according to a preset algorithm. For example, the first consumption messages may be associated message by converting the cumulative points of the recording material in the images formed in the outputted page or the cumulative mass of the recording material in the images formed in the outputted page according to a preset algorithm.

In an optional implementation, the consumption amount message of the recording material consumed by the quantity of outputted pages of corresponding job types directly obtained from the information processing apparatus may be used as the first consumption messages. Exemplarily, the consumption amount message of the recording material consumed by the quantity of outputted pages respectively corresponding to the n job types may be directly recorded in the information processing apparatus; that is, the first consumption messages of the recording material respectively corresponding to the n job types may be recorded in the information processing apparatus. In such way, the image-forming apparatus may obtain the consumption amount message of the recording material consumed by the quantity of outputted pages respectively corresponding to the n job types from the information processing apparatus. It should be noted that above-mentioned first consumption messages of the recording material respectively corresponding to the n job types may also be stored in other external devices electrically connected to the information processing apparatus. Therefore, the image-forming apparatus may obtain the first consumption messages of the recording respectively corresponding to the n job types from above-mentioned external devices through the information processing apparatus; that is, the image-forming apparatus may indirectly obtain the first consumption messages of the recording material respectively corresponding to the n job types through the information processing apparatus.

In another optional implementation manner, the image-forming apparatus may obtain the first consumption messages of the recording material respectively corresponding to the n job types through a manner that a consumption message obtaining instruction may be sent to the information processing apparatus to make the information processing apparatus feedback the first consumption messages of the recording material respectively corresponding to the n job types. At this point, when the image-forming apparatus needs to obtain the first consumption messages of the recording material, the image-forming apparatus may send a consumption message obtaining instruction to the information processing apparatus; after receiving the consumption message obtaining instruction, the information processing apparatus may send the first consumption messages of the recording material respectively corresponding to the n job types stored in the information processing apparatus or in above-mentioned external device to the image-forming apparatus. The image-forming apparatus may receive the first consumption messages of the recording material respectively corresponding to the n job types sent by the information processing apparatus.

In another optional implementation manner, the information processing apparatus may automatically send the first consumption messages of the recording material respectively corresponding to the n job types based on specific conditions. That is, the information processing apparatus may not send the first consumption messages of the recording material respectively corresponding to the n job types based on the consumption message obtaining instruction sent by the image-forming apparatus but send the first consumption messages of the recording material respectively corresponding to the n job types by itself when it determines that specific conditions are satisfied. Exemplarily, the information processing apparatus may update the initial first consumption messages of the recording material to obtain the first consumption messages of the recording material respectively corresponding to the n job types and send obtained first consumption messages of the recording material respectively corresponding to the n job types to the image-forming apparatus. It should be noted that above-mentioned first consumption messages of the recording material corresponding to the n job types may be stored in above-mentioned information processing apparatus or in other external devices electrically connected to above-mentioned information processing apparatus. When the first consumption messages is stored in other external devices electrically connected to above-mentioned information processing apparatus, the image-forming apparatus may obtain the first consumption messages of the recording material respectively corresponding to the n job types from above-mentioned external device through the information processing apparatus. That is, the image-forming apparatus may indirectly obtain the first consumption messages of the recording material respectively corresponding to the n job types through the information processing apparatus.

The above describes how the image-forming apparatus obtains the first consumption messages of the recording material respectively corresponding to the n job types from the information processing apparatus. Other manners of obtaining the initial outputted page quantity messages respectively corresponding to the n job types, the initial first consumption messages of the recording material respectively corresponding to the n job types, and the outputted page quantity messages respectively corresponding to the n job types may be similar, which may not be limited in embodiments of the present disclosure herein.

In embodiments of the present disclosure, the output jobs of the image-forming apparatus may be divided into P job types according to the outputted page quantity by the image-forming apparatus in a single job. The outputted page quantity by a single job corresponding to different job types may be different. P may be an integer greater than 1. That is, the output jobs of the image-forming apparatus may be divided into at least two job types according to the outputted page quantity by a single job. The n job types refer to the job types of total consumption message of the recording material using the method described in embodiments of the present disclosure, and n may be an integer greater than 1 and not greater than P. In order to more accurately estimate the consumption amount of the recording material, the value of n may be same as P.

A single job refers to a job completed by from starting to stopping the print engine of the image-forming apparatus once; that is, when there is a job to be printed in the image-forming apparatus, at least one main control motor in the image-forming apparatus may be from start-up to stop rotating and print out at least one page of the image.

In embodiments of the present disclosure, in order to facilitate counting the quantity of outputted pages corresponding to each job type, jobs whose quantity of pages corresponding to a single job falls within the same page range may be classified into the same type. The number of predefined page ranges and the scope of each range may be preset according to actual needs, a single predefined page range may contain multiple page values or only one page value, which is not limited in the present disclosure. which may not be limited in the present disclosure. For example, the number and scope of the predefined page ranges may be related to the structure and control logic of the image-forming apparatus, and the number or scope of the predefined page ranges configured for different image-forming apparatuses may vary.

Exemplarily, the n job types may include at least two of 1-page job type, 2-page job type, 3-page job type, 4-page job type and greater than 4-page job type. The 1-page job type may be a type that outputs 1 page in a single job, and its corresponding predefined page range may only include the page value of 1; the 2-page job type may be a type that outputs 2 pages in a single job, and its corresponding predefined page range may only include the page value of 2. Similarly, the same applies to the 3-page and 4-page job types, and the greater than 4-page job type may be a type that outputs greater than 4 pages in a single job, and its corresponding predefined page range may include integer page values of 5 and above. In total, five job types are defined, that is, P=5. When the value of n is 2, it indicates that among above five job types, only two job types may use the method described in the present disclosure to determine the total consumption message of the recording material. It is assumed that the total consumption message of the recording material is determined by the method described in the present disclosure for 2-page job type and 3-page job type, other job types, that is, 1-page job type, 4-page job type, and greater than 4-page job-type, may need other methods to determine the total consumption message of the recording material. When the value of n is P, it indicates that the method described in the present disclosure may be configured to determine the total consumption message of the recording material for all job types. Specific value of n may be configured according to actual needs, which may not be limited in the present disclosure.

At S202, the second consumption messages of the recording material respectively corresponding to the n job types respectively may be obtained.

The second consumption messages of the recording material may be configured to determine the consumption amount message of the recording material consumed by corresponding job types except the recording material consumed by outputted pages.

The second consumption message may be directly the consumption amount message of the recording material consumed by corresponding job types except the recording material consumed by the outputted pages, exemplarily, the cumulative points or cumulative mass (unit: mg) of the recording material consumed by corresponding job types except the recording material consumed by the outputted pages. The second consumption message may also be a calculation factor of the consumption amount of the recording material consumed by corresponding job types except the recording material consumed by the outputted pages. That is, the second consumption message may be configured to calculate and generate the consumption amount message of the recording material consumed by corresponding job types except the recording material consumed by the outputted pages according to a preset algorithm. Exemplarily, the second consumption message may be the associated message obtained by converting the cumulative points of the recording material in the outputted pages except formed images according to a preset algorithm.

In some embodiments, the information processing apparatus may directly store above-mentioned second consumption messages of the recording material respectively corresponding to the n job types. At this point, the image-forming apparatus may directly obtain the second consumption messages of the recording material respectively corresponding to the n job types from the information processing apparatus.

In other embodiments, if the second consumption messages of the recording material respectively corresponding to the n job types is stored in an external device connected to the information processing apparatus, the second consumption message may also be indirectly obtained from the external device through the information processing apparatus.

As an optional implementation manner, the image-forming apparatus may also obtain the second consumption messages of the recording material respectively corresponding to the n job types respectively by calculation.

At this point, the second consumption messages of above-mentioned recording material respectively corresponding to the n job types may include:

- obtaining the completed job quantities respectively corresponding to the n job types;
- obtaining a preset additional consumption message of the recording material respectively corresponding to the n job types, where additional consumption message of the recording material corresponding to any job type may be determined based on the consumption amount of consumed recording material except the recording material consumed by the outputted pages of the single job corresponding to such job type when the output job of such job type is performed once; and
- according to the preset additional consumption message of the recording material respectively corresponding to the n job types and the completed job quantities respectively corresponding to the n job types, determining the second consumption messages of the recording material respectively corresponding to the n job types.

In some embodiments, the image-forming apparatus may obtain the completed job quantities respectively corresponding to the n job types through the information processing apparatus. When the completed job quantities respectively corresponding to the n job types is stored in the information processing apparatus, the completed job quantities respectively corresponding to the n job types may be directly obtained from the information processing apparatus. In some embodiments, after each job output is completed, the image-forming apparatus may update the completed job quantities respectively corresponding to the n job types stored in the information processing apparatus.

Or in some embodiments, the image-forming apparatus may store the completed job quantities respectively corresponding to the n job types in its internal storage device and update the completed job quantities respectively corresponding to the n job types stored therein after each job output is completed. When it needs to obtain the completed job quantities respectively corresponding to the n job types, the completed job quantities respectively corresponding to the n job types stored therein may be directly obtained.

In some embodiments, the additional consumption message of the recording material respectively corresponding to the n job types may be obtained in advance, and the additional consumption message of the recording material respectively corresponding to the preset n job types may be stored in the information processing apparatus or other storage devices. The image-forming apparatus may obtain the additional consumption message of the recording material respectively corresponding to the preset n job types from the information processing apparatus or other storage devices.

Obviously, the image-forming apparatus may also store the additional consumption message of the recording material respectively corresponding to the n job types, and directly obtain the additional consumption message of the recording material respectively corresponding to the n job types stored therein when the additional consumption message is needed.

In such way, after the image-forming apparatus obtains the completed job quantities respectively corresponding to the n job types and preset additional consumption message of the recording material respectively corresponding to the n job types, additional consumption amount of the recording material respectively corresponding to the n job types may be calculated based on the completed job quantities respectively corresponding to the n job types and preset additional consumption message of the recording material respectively corresponding to the n job types; that is, the second consumption messages of the recording material respectively corresponding to the n job types may be obtained.

In some embodiments, in order to reduce the complexity of data storage, the image-forming apparatus may obtain the completed job quantities respectively corresponding to the n job types by calculation. At this point, obtaining the completed job quantities respectively corresponding to the n job types mentioned above may include obtaining outputted page quantity messages respectively corresponding to the n job types from the information processing apparatus.

When the image-forming apparatus needs to calculate the completed job quantities respectively corresponding to the n job types, the outputted page quantity messages respectively corresponding to the n job types currently stored in the information processing apparatus may be obtained from the information processing apparatus. After obtaining the outputted page quantity messages respectively corresponding to the n job types, the completed job quantities respectively corresponding to the n job types may be determined based on the outputted page quantity messages respectively corresponding to the n job types and the quantity of outputted pages of a single job corresponding to each of the n job types.

In some embodiments, the image-forming apparatus may directly read the outputted page quantity messages respectively corresponding to the n job types currently stored in the information processing apparatus.

In other embodiments, the information processing apparatus may automatically send the outputted page quantity messages respectively corresponding to the n job types currently stored based on specific conditions. Exemplarily, the information processing apparatus may update the initial outputted page quantity message to obtain the outputted page quantity messages respectively corresponding to the n job types and send obtained outputted page quantity messages respectively corresponding to the n job types to the image-forming apparatus.

In other embodiments, the image-forming apparatus may obtain the outputted page quantity messages respectively corresponding to the n job types currently stored in the information processing apparatus by sending a consumption message obtaining instruction to the information processing apparatus. It should be understood that the image-forming apparatus may obtain the first consumption messages of the recording material respectively corresponding to the n job types by sending the consumption message obtaining instruction to the information processing apparatus. Therefore, the image-forming apparatus may simultaneously obtain the first consumption messages of the recording material respectively corresponding to the n job types stored in the information processing apparatus and the outputted page quantity messages respectively corresponding to the n job types by sending the consumption message obtaining instruction to the information processing apparatus once.

The image-forming apparatus may also obtain the first consumption messages of the recording material respectively corresponding to the n job types stored in the information processing apparatus and the outputted page quantity messages respectively corresponding to the n job types respectively through two consumption message obtaining instructions, which may not be limited in the present disclosure.

In other embodiments, the image-forming apparatus may obtain the outputted page quantity messages respectively corresponding to the n job types from other external devices, such as a transfer device configured between the information processing apparatus and the image-forming apparatus. Specific process refers to above description of obtaining the outputted page quantity messages respectively corresponding to the n job types from the information processing apparatus, which may not be described in detail herein.

As described in above-mentioned embodiments, the information processing apparatus may store the outputted page quantity message for five job types respectively, that is, 1-page job type, 2-page job type, 3-page job type, 4-page job type, and greater than 4-page job type. It is assumed that the outputted page quantity for the 1-page job type stored in the information processing apparatus is TP1 pages, the outputted page quantity for the 2-page job type is TP2 pages, the outputted page quantity for the 3-page job type is TP3 pages, the outputted page quantity for a 4-page job type is TP4 pages, and the outputted page quantity for greater than-4 page job type is TP5 pages. After obtaining the outputted page quantity messages respectively corresponding to the five job types (that is, 1-page job type, 2-page job type, 3-page job type, 4-page job type, and greater than 4-page job type), according to the outputted page quantity messages respectively corresponding to the five job types (that is, 1-page job type, 2-page job type, 3-page job type, 4-page job type, and greater than 4-page job type), and the single-job outputted page quantity corresponding to the five job types (that is, 1-page job type, 2-page job type, 3-page job type, 4-page job type, and greater than 4-page job type), the completed job quantities respectively corresponding to the five job types (that is, 1-page job type, 2-page job type, 3-page job type, 4-page job type, and greater than 4-page job type) may be determined. In one embodiment, the single-job outputted page quantity corresponding to the 1-page job type is 1 page, so that the image-forming apparatus may calculate the completed job quantities respectively corresponding to the 1-page job type as: TP1÷1=TP1, based on the quantity of outputted pages recorded in the outputted page quantity messages respectively corresponding to the 1-page job type as TP1 pages; that is, the completed job quantities respectively corresponding to the 1-page job type is TP1. Similarly, the single-job outputted page quantity corresponding to the 2-page job type is 2 pages, so that the image-forming apparatus may calculate the completed job quantities respectively corresponding to the 2-page job type as TP2/2, based on the quantity of outputted pages recorded in the outputted page quantity messages respectively corresponding to the 2-page job type; that is, the completed job quantities respectively corresponding to the 2-page job type is TP2/2. The single-job outputted page quantity corresponding to the 3-page job type is 3 pages, so that the image-forming apparatus may calculate the completed job quantities respectively corresponding to the 3-page job type as TP3/3, based on the quantity of outputted pages recorded in the outputted page quantity messages respectively corresponding to the 3-page job type; that is, the completed job quantities respectively corresponding to the 3-page job type is TP3/3. The single-job outputted page quantity corresponding to the 4-page job type is 4 pages, the image-forming apparatus may calculate the completed job quantities respectively corresponding to the 4-page job type as TP4/4, based on the quantity of outputted pages recorded in the outputted page quantity messages respectively corresponding to the 4-page job type; that is, the completed job quantities respectively corresponding to the 4-page job type is TP4/4. If the single-job outputted page quantity corresponding to the greater than 4-page job type is set to y pages, the image-forming apparatus may calculate the completed job quantities respectively corresponding to the greater than 4-page job type as TP5/y, based on the quantity of outputted pages recorded in the outputted page quantity messages respectively corresponding to the greater than 4-page job type; that is, the completed job quantities respectively corresponding to the greater than 4-page job type is TP5/y, where y is average outputted page quantity by a single print job in the greater than 4-page job type obtained by statistics, and y may also be configured according to actual needs, which may not be limited in the present disclosure. It should be understood that when the predefined page range corresponding to a job type contains only one page value, the completed job quantities for that job type is equal to the result of dividing the number of outputted pages by the single page value contained in the predefined page range for that job type. When the predefined page range corresponding to a job type contains two or more page values, the completed job quantities for that job type is equal to the result of dividing the number of outputted pages by the value y. Preferably, the value y is the average number of pages output per job in that job type, obtained through statistical analysis. Of course, the value y may also be set according to actual needs. For example, the value y could be an empirical value, or it could be the median of the two or more page values contained in the predefined page range for that job type, or it could be the average of the two or more page values contained in the predefined page range for that job type. This is not limited in the present disclosure.

After calculating the quantities of completed jobs respectively corresponding to the five job types, the preset additional consumption message of the recording material respectively corresponding to the five job types may be obtained. It is assumed that preset additional consumption message of the recording material respectively corresponding to the five job types may be that the additional consumption message of the recording material corresponding to the 1-page job type is a1, the additional consumption message of the recording material corresponding to the 2-page job type is a2, the additional consumption message of the recording material corresponding to the 3-page job type is a3, the additional consumption message of the recording material corresponding to the 4-page job type is a4, and the additional consumption message of the recording material corresponding to the greater than 4-page job type is a5. At this point, the image-forming apparatus may calculate the second consumption messages of the recording material respectively corresponding to the five job types. That is, the image-forming apparatus may calculate the second consumption messages of the recording material corresponding to the 1-page job type as TP1*a1 based on the additional consumption message of the recording material corresponding to the 1-page job type as a1 and the completed job quantities corresponding to the 1-page job type. Similarly, the image-forming apparatus may calculate the second consumption messages of the recording material corresponding to the 2-page job type as TP2/2*a2 based on the additional consumption message of the recording material corresponding to the 2-page job type as a2 and the completed job quantities corresponding to the 2-page job type. The image-forming apparatus may calculate the second consumption messages of the recording material corresponding to the 3-page job type as TP3/3*a3 based on the additional consumption message of the recording material corresponding to the 3-page job type as a3 and the completed job quantities corresponding to the 3-page job type. The image-forming apparatus may calculate the second consumption messages of the recording material corresponding to the 4-page job type as TP4/4*a based on the additional consumption message of the recording material corresponding to the 4-page job type as a4 and the completed job quantities corresponding to the 4-page job type. The image-forming apparatus may calculate the second consumption messages of the recording material corresponding to the greater than 4-page job type as TP5/y*a5 based on the completed job quantities corresponding to the greater than 4-page job type, where a5 is the average value of the additional consumption amounts of the recording material for a single print job in the greater than 4-page job type obtained by statistics.

At S203, according to the first consumption messages of the recording material respectively corresponding to the n job types and the second consumption messages of the recording material respectively corresponding to the n job types, total consumption message of the recording material in the consumable may be determined.

In embodiments of the present disclosure, after the image-forming apparatus obtains the first consumption messages of the recording material respectively corresponding to the n job types and the second consumption messages of the recording material respectively corresponding to the n job types, the consumption amount of the recording material in the first consumption messages of the recording material respectively corresponding to the n job types and the consumption amount of the second consumption messages of the recording material respectively corresponding to the n job types may be added together to calculate the total consumption amount of the recording material in the consumable, which may be configured as the total consumption message of the recording material in the consumables finally estimated.

As described above, the second consumption messages of the recording material respectively corresponding to the five job types (that is, 1-page job type, 2-page job type, 3-page job type, 4-page job type, and greater than 4-page job type) obtained by the image-forming apparatus may be TP1*a1, TP2/2*a2, TP3/3*a3, TP4/4*a4, and TP5/y*a5. It is assumed that the first consumption messages of the recording material respectively corresponding to the five job types (that is, 1-page job type, 2-page job type, 3-page job type, 4-page job type and greater than 4-page job type) obtained by the image-forming apparatus may be TD1, TD2, TD3, TD4 and TD5. That is, TD1 indicates the total consumption amount of the recording material consumed by the quantity of outputted pages corresponding to the output job of the 1-page job type read from the information processing apparatus by the image-forming apparatus; TD2 indicates the total consumption amount of the recording material consumed by the quantity of outputted pages corresponding to the output job of the 2-page job type read from the information processing apparatus by the image-forming apparatus; TD3 indicates the total consumption amount of the recording material consumed by the quantity of outputted pages corresponding to the output job of the 3-page job type read from the information processing apparatus by the image-forming apparatus; TD4 indicates the total consumption amount of the recording material consumed by the quantity of outputted pages corresponding to the output job of the 4-page job type read from the information processing apparatus by the image-forming apparatus; and TD5 indicates the total consumption amount of the recording material consumed by the quantity of outputted pages corresponding to the output job of the greater than 4-page job type read from the information processing apparatus by the image-forming apparatus. At this point, the image-forming apparatus may estimate the consumption amount message of the recording material based on the second consumption message and the first consumption messages of the recording material corresponding to the five job types, that is, 1-page job type, 2-page job type, 3-page job type, 4-page job type, and greater than 4-page job type. That is, the image-forming apparatus may add the consumption amounts in the second consumption message and the first consumption messages of the recording material respectively corresponding to the five job types (that is, 1-page job type, 2-page job type, 3-page job type, 4-page job type and greater than 4-page job type) to calculate the total consumption amount of the recording material. The calculated total consumption amount of the recording material may be determined as the total consumption message of the recording material in consumables. At this point, the total consumption message of the recording material in consumables may be $$(TP1*a1+TD1)+(TP2/2*a2+TD2)+(TP3/3*a3+TD3)+(TP4/4*a4+TD4)+(TP5/y*a5+TD5).$$

It should be noted that the execution order of S201 and S202 may be not limited in embodiments of the present disclosure.

In embodiments of the present disclosure, when determining the consumption message of the recording material, it needs not only to determine the consumption amounts of the recording material consumed by the outputted page quantity corresponding to the n job types, but also to determine the second consumption messages respectively corresponding to the n job types, thereby improving the accuracy of the evaluation result of final total consumption amount of the recording material and improving the user experience. In addition, in embodiments of the present disclosure, printed page quantity messages respectively corresponding to various job types may be counted, and additional consumption amounts of the recording material respectively corresponding to various job types except the consumption amount of the recording material consumed by the outputted pages may be calculated and recorded. The additional consumption amount of the recording material obtained by calculation may be more accurate, which may improve the accuracy of the evaluation result of final consumption amount of the recording material and further improve the user experience.

In embodiments of the present disclosure, before determining the total consumption message of the recording material in the consumable, in order to ensure the accuracy of the total consumption message, the image-forming apparatus may verify whether the information processing apparatus meets expectation. The method shown in FIG. 2 may further include the step for determining whether the information processing apparatus meets expectation. Two implementation manners for determining whether the information processing apparatus meets expectation are exemplarily described hereinafter.

Referring to FIG. 4, an implementation manner for determining whether the information processing apparatus meets expectation, referred to as manner "1", may include the following exemplary steps.

At S401, the image-forming apparatus may obtain the initial first consumption messages of the recording material respectively corresponding to the n job types and the initial outputted page quantity messages respectively corresponding to the n job types from the information processing apparatus.

In embodiments of the present disclosure, the initial first consumption messages of the recording material respectively corresponding to above-mentioned n job types and the initial outputted page quantity messages respectively corresponding to the n job types may be provided to the image-forming apparatus by the information processing apparatus. In embodiments of the present disclosure, the initial first consumption messages of the recording material respectively corresponding to the n job types and the initial outputted page quantity messages respectively corresponding to the n job types mentioned above may be directly stored in the information processing apparatus or an external device connected to the information processing apparatus; or may be a result pre-calculated by the information processing apparatus.

At S402, the image-forming apparatus may obtain an identification message of the information processing apparatus.

In some embodiments, the image-forming apparatus may directly read the identification message stored in the information processing apparatus. In other embodiments, the image-forming apparatus may directly or indirectly send an identification message obtaining instruction to the information processing apparatus; and after receiving the identification message obtaining instruction, the information processing apparatus may directly or indirectly send corresponding identification message to the image-forming apparatus.

It should be understood that the identification message of the information processing apparatus may be configured to identify corresponding information processing apparatus, for example, may be a serial number of the information processing apparatus.

At S403, the image-forming apparatus may obtain outputted page quantity history messages respectively corresponding to the n job types and the first consumption history message of the recording material respectively corresponding to the n job types according to the identification message of the information processing apparatus.

In embodiments of the present disclosure, after the image-forming apparatus obtains the identification message of the information processing apparatus, when the image-forming apparatus stores outputted page quantity history messages respectively corresponding to the n job types and first consumption history message of the recording material respectively corresponding to the n job types, the outputted page quantity history messages respectively corresponding to the n job types and first consumption history message of the recording material respectively corresponding to the n job types may be found from the consumption history message of each information processing apparatus stored in the information processing apparatus according to the identification message of the information processing apparatus. That is, the image-forming apparatus may find out the outputted page quantity history messages respectively corresponding to the n job types and first consumption history message of the recording material respectively corresponding to the n job types in the consumption history message stored in the information processing apparatus according to the identification message of the information processing apparatus obtained.

In some embodiments, when the outputted page quantity history messages respectively corresponding to the n job types and the first consumption history message of the recording material respectively corresponding to the n job types are stored in a cloud server or other external devices, the image-forming apparatus may obtain the outputted page quantity history messages respectively corresponding to the n job types and the first consumption history message of the recording material respectively corresponding to the n job types in the cloud server or other external devices according to the identification message of the information processing apparatus.

At S404, the image-forming apparatus may determine whether the information processing apparatus meets expectation based on the outputted page quantity history messages respectively corresponding to the n job types and the initial outputted page quantity messages respectively corresponding to the n job types.

In embodiments of the present disclosure, the image-forming apparatus may compare the outputted page quantity history messages respectively corresponding to any one of the n job types and the initial outputted page quantity messages respectively corresponding to such job type in the n job types and obtain multiple first comparison results; and determine whether the information processing apparatus meets expectation based on multiple first comparison results. Exemplarily, when there is a comparison result indicating that the initial outputted page quantity messages respectively corresponding to the n job types is less than the outputted page quantity history messages respectively corresponding to the n job types among the multiple first comparison results, it is determined that the information processing apparatus may not meet expectation, and the information processing apparatus may be abnormal.

When the multiple first comparison results all indicate that the initial outputted page quantity messages respectively corresponding to the n job types is greater than or equal to the outputted page quantity history messages respectively corresponding to the n job types, it is determined that the information processing apparatus may meet expectation, and the information processing apparatus may be normal. In embodiments of the present disclosure, when the information processing apparatus is abnormal, the information processing apparatus cannot store data correctly. Therefore, the total consumption message of the recording material calculated based on the data stored by the information processing apparatus may be inaccurate.

For example, the outputted history page quantities corresponding to the n job types may be 11 pages, 12 pages, 15 pages, 16 pages, and 20 pages, respectively; and the single-job outputted page quantities of corresponding job types may be 1 page, 2 pages, 3 pages, 4 pages, and greater than 4 pages. The initial outputted page quantities respectively corresponding to the n job types may be 9 pages, 12 pages, 12 pages, 20 pages, and 20 pages, respectively. Therefore, the multiple first comparison results may respectively indicate that the outputted history page quantity corresponding to the 1-page job type may be greater than the initial outputted page quantity, the outputted history page quantity corresponding to the 2-page job type may be equal to the initial outputted page quantity, the outputted history page quantity corresponding to the 3-page job type may be greater than the initial outputted page quantity, the outputted history page quantity corresponding to the 4-page job type may be less than the initial outputted page quantity, and the outputted history page quantity corresponding to the greater than 4-page job type may be equal to the initial outputted page quantity. That is, among the multiple first comparison results, if there is at least one comparison result indicating that the outputted history page quantity corresponding to a certain job type is greater than the initial outputted page quantity, it is determined that the information processing apparatus may not meet expectation.

At S405, the image-forming apparatus may determine whether the information processing apparatus meets expectation based on the first consumption history message of the recording material respectively corresponding to the n job types and the initial first consumption messages of the recording material respectively corresponding to the n job types.

In embodiments of the present disclosure, the image-forming apparatus may compare the first consumption history message corresponding to any one of the n job types and the initial first consumption messages of the recording material respectively corresponding to such job type in the quantity n of job type and may obtain multiple second comparison results; and may determine whether the information processing apparatus meets expectation based on the multiple second comparison results. Exemplarily, when multiple second comparison results indicate that the initial first consumption messages of the recording material respectively corresponding to the n job types is less than the first consumption history message of the recording material respectively corresponding to the n job types, it is determined that the information processing apparatus may not meet expectation, and the information processing apparatus may be abnormal.

When multiple second comparison results all indicate that the initial first consumption messages of the recording material respectively corresponding to the n job types is greater than or equal to the first consumption history message of the recording material respectively corresponding to the n job types, it is determined that the information processing apparatus may meet expectation, and the information processing apparatus may be normal. In embodiments of the present disclosure, when the information processing apparatus is abnormal, the information processing apparatus cannot store data correctly. Therefore, the total consumption message of the recording material calculated based on the data stored by the information processing apparatus may be inaccurate.

It should be noted that, for S404 and S405, in embodiments of the present disclosure, only one of these two exemplary steps may be executed, or both exemplary steps may be executed. That is, only exemplary step related to "determine whether the information processing apparatus meets expectation based on the outputted page quantity history messages respectively corresponding to the n job types and the initial outputted page quantity messages respectively corresponding to the n job types" may be executed. That is, the image-forming apparatus may only need to obtain the outputted page quantity history messages respectively corresponding to the n job types and the initial outputted page quantity messages respectively corresponding to the n job types and determine whether the information processing apparatus meets expectation based on the outputted page quantity history messages respectively corresponding to the n job types and the initial outputted page quantity messages respectively corresponding to the n job types. Or only exemplary step related to "determine whether the information processing apparatus meets expectation according to the first consumption history message of the recording material respectively corresponding to the n job types and the initial first consumption messages of the recording material respectively corresponding to the n job types" may be executed. That is, the image-forming apparatus may only need to obtain the first consumption history message of the recording material respectively corresponding to the n job types and the initial first consumption messages respectively corresponding to the n job types, and determine whether the information processing apparatus meets expectation based on the first consumption history message of the recording material respectively corresponding to the n job types and the initial first consumption messages of the recording material respectively corresponding to the n job types. Or exemplary step related to "determine whether the information processing apparatus meets expectation according to the outputted page quantity history messages respectively corresponding to the n job types and the initial outputted page quantity messages respectively corresponding to the n job types" may be executed; and exemplary step related to "determine whether the information processing apparatus meets expectation according to the first consumption history messages of the recording material respectively corresponding to the n job types and the initial first consumption messages of the recording material respectively corresponding to the n job types" may be also executed. That is, it is determined whether the information processing apparatus meets expectation only based on above-mentioned multiple first comparison results or multiple second results. When multiple first comparison results all indicate the comparison result that the initial outputted page quantity messages respectively corresponding to the n job types is greater than or equal to the outputted page quantity history messages respectively corresponding to the n job types, it is determined that the information processing apparatus may meet expectation; or when the second comparison results all indicate that the initial first consumption messages of the recording material respectively corresponding to the n job types is greater than or equal to the first consumption history messages of the recording material respectively corresponding to the n job types, it is determined that the information processing apparatus may meet expectation. When both S404 and S405 are executed, the execution order of S404 and S405 may not be limited in embodiments of the present disclosure.

The execution order of S401 and S403 may not be limited in embodiments of the present disclosure In order to detect whether the information processing apparatus meets expectation, in another implementation manner, referred to as manner "2", the image-forming apparatus may further include the following exemplary steps before determining the total consumption message of the recording material in the consumables, as shown in FIG. 4.

At S401, the image-forming apparatus may obtain the initial first consumption messages of the recording material respectively corresponding to the n job types and the initial outputted page quantity messages respectively corresponding to the n job types from the information processing apparatus.

It should be understood that S401 herein is consistent with above-mentioned S401, which may not be described in detail.

At S406, after the image-forming apparatus completes current output job, the image-forming apparatus may send the page quantity increment message corresponding to current output job and the first consumption increment message of the recording material corresponding to current output job to the information processing apparatus.

It may be understood that the information processing apparatus may receive the page quantity increment message corresponding to current output job and the first consumption increment message of the recording material corresponding to current output job sent by the image-forming apparatus and may update the initial first consumption messages and the initial outputted page quantity message of the recording material. For example, the first consumption increment message of the recording material corresponding to current output job may be added to the initial first consumption messages of the recording material corresponding to current output job; and the page quantity increment message corresponding to current output job may be added to the initial outputted page quantity message corresponding to current output job.

For example, the information processing apparatus may directly determine corresponding job type according to the page quantity increment message corresponding to current output job. Exemplarily, if the page quantity increment corresponding to current output job is 3 pages, the first consumption increment of the recording material corresponding to current output job may be 774 thousand points or the first consumption increment of the recording material corresponding to current output job may be 17 milligrams. Therefore, 3 pages may be added to the initial outputted page quantity messages respectively corresponding to the 3-page job type; 774 thousand points may be added to the initial first consumption messages of the recording material corresponding to the 3-page job type, or 17 milligrams may be added to the initial first consumption messages of the recording material corresponding to the 3-page job type.

Optionally, after the image-forming apparatus completes current output job, in addition to sending the page quantity increment message corresponding to current output job and the first consumption increment message of the recording material corresponding to current output job, the job type message corresponding to current output job may also be sent. Therefore, the information processing apparatus may directly update the initial first consumption messages and the initial outputted page quantity message of the corresponding recording material according to the job type message corresponding to current output job.

At S412, after completing current output job, the image-forming apparatus may obtain the first consumption messages of the recording material respectively corresponding to the n job types from the information processing apparatus.

In embodiments of the present disclosure, the first consumption messages of the recording material respectively corresponding to the n job types obtained by the image-forming apparatus from the information processing apparatus may include the first consumption messages of the recording material of corresponding job types in the n job types determined by the information processing apparatus according to the first consumption increment message of the recording material corresponding to current output job. Specific obtaining process may refer to S201 and S301-S302, which may not be described in detail herein.

At S413, after completing current output job, the image-forming apparatus may obtain the outputted page quantity messages respectively corresponding to the n job types from the information processing apparatus.

In embodiments of the present disclosure, the outputted page quantity messages respectively corresponding to the n job types obtained by the image-forming apparatus from the information processing apparatus may include the outputted page quantity message of corresponding job types in the n job types determined by the information processing apparatus according to the page quantity increment message corresponding to current output job. Specific obtaining process may refer to S201, and S301-S302, which may not be described in detail herein.

At S414, the image-forming apparatus may determine whether the information processing apparatus meets expectation.

In embodiments of the present disclosure, before determining the total consumption message of the recording material in the consumable, the image-forming apparatus may verify whether the information processing apparatus meets expectation in order to ensure the accuracy of the total consumption message.

As an optional implementation manner, determining whether the information processing apparatus meets expectation by the image-forming apparatus may include:

- the image-forming apparatus may determine whether the information processing apparatus meets expectation based on the first consumption messages of the recording material respectively corresponding to the n job types and the initial first consumption messages of the recording material respectively corresponding to the n job types; or
- the image-forming apparatus may determine whether the information processing apparatus meets expectation based on the outputted page quantity messages respectively corresponding to the n job types and the initial outputted page quantity messages respectively corresponding to the n job types; or
- the image-forming apparatus may determine whether the information processing apparatus meets expectation based on the first consumption messages of the recording material respectively corresponding to the n job types, the initial first consumption messages of the recording material respectively corresponding to the n job types, the outputted page quantity messages respectively corresponding to the n job types, and the initial outputted page quantity messages respectively corresponding to the n job types.

In embodiments of the present disclosure, the image-forming apparatus may respectively compare the outputted page quantity messages respectively corresponding to any one of the n job types and the initial outputted page quantity messages respectively corresponding to such job type in the n job types, and multiple third comparison results may be obtained; may compare the first consumption messages of the recording material corresponding to any one of the n job types and the initial first consumption messages respectively corresponding to such job type in the n job types, and multiple fourth comparison results may be obtained; and may determine whether the information processing apparatus meets expectation based on the multiple third comparison results and the multiple fourth comparison results. Exemplarily, when there is no comparison result indicating that the outputted page quantity messages respectively corresponding to the n job types is greater than the initial outputted page quantity messages respectively corresponding to the n job types in the multiple third comparison results, or when there is a comparison result indicating that the outputted page quantity messages respectively corresponding to the n job types is less than the initial outputted page quantity messages respectively corresponding to the n job types in the multiple third comparison results, or there is no comparison result indicating that the first consumption messages respectively corresponding to the n job types is greater than the initial first consumption messages of the recording material respectively corresponding to the n job types in the multiple fourth comparison results, or there is a comparison result indicating that the first consumption messages respectively corresponding to the n job types is less than the initial first consumption messages of the recording material respectively corresponding to the n job types in the multiple fourth comparison results, it is determined that the information processing apparatus may not meet expectation, and the information processing apparatus may be abnormal. When there is a comparison result indicating that the initial outputted page quantity messages respectively corresponding to each of the n job types is less than the outputted page quantity messages respectively corresponding to such job type in the n job types among the multiple third comparison results, and when there is no comparison result indicating that the initial outputted page quantity messages respectively corresponding to each of the n job types is greater than the outputted page quantity messages respectively corresponding to such job type in the n job types among the multiple third comparison results, and when there is a comparison result indicating that the initial first consumption messages of the recording material corresponding to each of the n job types is less than the first consumption messages of the recording material corresponding to such job type among the multiple fourth comparison results, and when there is no comparison result indicating that the initial first consumption messages of the recording material corresponding to each of the n job types is greater than the first consumption messages of the recording material corresponding to such job type among the multiple fourth comparison results, it is determined that the information processing apparatus may meet expectation, and the information processing apparatus may be normal. In embodiments of the present disclosure, when the information processing apparatus is abnormal, the information processing apparatus cannot store data correctly, such that the total consumption message of the recording material calculated based on the data stored by the information processing apparatus may be inaccurate.

Furthermore, in embodiments of the present disclosure, it is determined that whether the information processing apparatus meets expectation based only on the multiple third comparison results or multiple fourth comparison results mentioned above. When there is no comparison result indicating that the outputted page quantity messages respectively corresponding to the n job types is greater than the initial outputted page quantity messages respectively corresponding to the n job types among the multiple third comparison results, or when there is a comparison result indicating that the outputted page quantity messages respectively corresponding to the n job types is less than the initial outputted page quantity messages respectively corresponding to the n job types among the multiple third comparison results, it is determined that the information processing apparatus may meet expectation. Or when there is a comparison result indicating that the initial first consumption messages of the recording material corresponding to each of the n job types is less than the first consumption messages of the recording material corresponding to the job type among the multiple fourth comparison results, and when there is no comparison result indicating that the initial first consumption messages of the recording material corresponding to each of the n job types is greater than the first consumption messages of the recording material corresponding to the job type among the multiple fourth comparison results, it is determined that the information processing apparatus may meet expectation.

As another optional implementation manner, determining whether the information processing apparatus meets expectation by the image-forming apparatus may include the following manners.

For the manner "a", the image-forming apparatus may determine whether the information processing apparatus meets expectation based on the first consumption messages of the recording material respectively corresponding to the n job types, the initial first consumption messages of the recording material respectively corresponding to the n job types, the first consumption increment message of the recording material corresponding to current output job, and the page quantity increment message corresponding to current output job.

For the manner "b", the image-forming apparatus may determine whether the information processing apparatus meets expectation based on the outputted page quantity messages respectively corresponding to the n job types, the initial outputted page quantity messages respectively corresponding to the n job types, and the page quantity increment message corresponding to current output job.

For the manner "c", the image-forming apparatus may determine whether the information processing apparatus meets expectation based on the first consumption messages of the recording material respectively corresponding to the n job types, the initial first consumption messages of the recording material respectively corresponding to the n job types, the first consumption increment message of the recording material corresponding to current output job, the outputted page quantity messages respectively corresponding to the n job types, the initial outputted page quantity messages respectively corresponding to the n job types, and the page quantity increment message corresponding to current output job.

For example, the manner "a" may include the following exemplary steps. The image-forming apparatus may determine the job type corresponding to current output job based on the page quantity increment message corresponding to current output job, where the job type X is assumed; based on the job type X, the image-forming apparatus may determine the initial first consumption messages of the recording material respectively corresponding to the n job types that needs to be adjusted and the initial first consumption messages that does not need to be adjusted, in the initial first consumption messages of the recording material respectively corresponding to the n job types; for the initial first consumption messages that needs to be adjusted, the image-forming apparatus may add the first consumption increment message of the recording material corresponding to current output job based on the initial first consumption messages to obtain basic first consumption messages respectively corresponding to the job type X; for the initial first consumption messages that does not need to be adjusted, the initial first consumption messages of the recording material of corresponding job types may be directly determined as basic first consumption messages of the recording material corresponding to the job type, thereby obtaining basic first consumption messages of the recording material respectively corresponding to the n job types; basic first consumption messages of the recording material respectively corresponding to each of the n job types may be compared with the first consumption messages of the recording material respectively corresponding to such job type to obtain the quantity n of fifth comparison results; when there is a comparison result among the quantity n of fifth comparison results indicating that the basic first consumption messages and the first consumption messages of the recording material corresponding to any job type are inconsistent with each other, it is determined that the information processing apparatus may not meet expectation; and when the quantity n of fifth comparison results all indicate that the basic first consumption messages and the first consumption messages of the recording material corresponding to any job type are consistent with each other, it is determined that the information processing apparatus may meet expectation.

For example, the manner "b" may include the following exemplary steps. The image-forming apparatus may determine the job type corresponding to current output job based on the page quantity increment message corresponding to current output job, where the job type X is assumed; the image-forming apparatus may determine the initial outputted page quantity message that needs to be adjusted and the initial outputted page quantity message that does not need to be adjusted among the initial outputted page quantity respectively corresponding to the n job types based on the job type X; for the initial outputted page quantity message that needs to be adjusted, the page quantity increment message corresponding to current output job may be added to the initial outputted page quantity message to obtain the basic outputted page quantity messages respectively corresponding to the job type X; for the initial outputted page quantity message that does not need to be adjusted, the initial outputted page quantity message of corresponding job types may be directly determined as the basic outputted page quantity messages respectively corresponding to such job type, thereby obtaining the basic outputted page quantity message of the recording material respectively corresponding to the n job types; the basic outputted page quantity messages respectively corresponding to each of the n job types may be compared with the outputted page quantity messages respectively corresponding to such job type to obtain the quantity n of sixth comparison results; when there is a comparison result among the quantity n of sixth comparison results indicating that the basic outputted page quantity message and the outputted page quantity messages respectively corresponding to any job type are inconsistent with each other, it is determined that the information processing apparatus may not meet expectation; and when the quantity n of sixth comparison results all indicate that the basic outputted page quantity message and the outputted page quantity messages respectively corresponding to any job type are consistent with each other, it is determined that the information processing apparatus may meet expectation.

For the manner “c”, whether the information processing apparatus meets expectation may be determined based on the quantity n of fifth comparison results and the quantity n of sixth comparison results mentioned above; when there is a comparison result among the quantity n of fifth comparison results indicating that the basic first consumption messages and the first consumption messages of the recording material corresponding to any job type are inconsistent with each other, or there is a comparison result among the quantity n of sixth comparison results indicating that the basic outputted page quantity message and the outputted page quantity messages respectively corresponding to any job type are inconsistent with each other, it is determined that the information processing apparatus may not meet expectation; and when the quantity n of fifth comparison results all indicate that the basic first consumption messages and the first consumption messages of the recording material corresponding to any job type are consistent with each other, and when the quantity n of sixth comparison results all indicate that the basic outputted page quantity message and the outputted page quantity messages respectively corresponding to any job type are consistent with each other, it is determined that the information processing apparatus may meet expectation.

Obviously, the manners “a”, “b”, and “c” may further include the following exemplary steps respectively.

For example, the manner “a” may include the following exemplary steps. The image-forming apparatus may determine the job type corresponding to current output job according to the page quantity increment message corresponding to current output job, where the job type X is assumed; corresponding initial first consumption messages may be subtracted from the first consumption messages of the recording material of the job type X to obtain the first consumption difference message corresponding to the job type X; for the initial first consumption messages that does not need to be adjusted, the first consumption difference message of the recording material of corresponding job types may be directly determined to be 0, thereby obtaining the first consumption difference messages of the recording material respectively corresponding to the n job types respectively; the first consumption difference message of the recording material corresponding to each of the n job types and the first consumption increment message of the recording material corresponding to the n job types may be compared to obtain the quantity n of seventh comparison results; when there is a comparison result among the quantity n of seventh comparison results indicating that the first consumption difference message and the first consumption increment message of the recording material corresponding to any job type are inconsistent with each other, it is determined that the information processing apparatus may not meet expectation; and when the quantity n of seventh comparison results all indicate that the first consumption difference message and the first consumption increment message of the recording material corresponding to any job type are consistent with each other, it is determined that the information processing apparatus may meet expectation.

For example, the manner “b” may include the following exemplary steps. The image-forming apparatus may determine the job type corresponding to current output job according to the page quantity increment message corresponding to current output job, where the job type X is assumed; corresponding initial outputted page quantity message may be subtracted from the outputted page quantity message of the job type X to obtain the outputted page quantity difference message corresponding to the job type X; for the initial outputted page quantity message that does not need to be adjusted, the outputted page quantity difference messages of corresponding job types may be directly determined to be 0, thereby obtaining the outputted page quantity difference messages respectively corresponding to the n job types respectively; the outputted page difference message respectively corresponding to each of the n job types may be compared with the page quantity increment messages respectively corresponding to the n job types to obtain the quantity n of eighth comparison results; when there is a comparison result among the n eighth comparison results indicating that the outputted page difference message and page quantity increment messages respectively corresponding to any job type are inconsistent with each other, it is determined that the information processing apparatus may not meet expectation; and when the quantity n of eighth comparison results all indicate that the outputted page quantity difference message and page count increment message respectively corresponding to any job type are consistent with each other, it is determined that the information processing apparatus may meet expectation.

For the manner “c”, whether the information processing apparatus meets expectation may be determined based on the quantity n of seventh comparison results and the quantity n of eighth comparison results; when there is a comparison result among the n seventh comparison results indicating that the first consumption difference message and the first consumption increment message of the recording material corresponding to any job type are inconsistent with each other, or when there is a comparison result among the n eighth comparison results indicating that the outputted page quantity difference message and the page quantity increment messages respectively corresponding to any job type are inconsistent with each other, it is determined that the information processing apparatus may not meet expectation; and when the quantity n of seventh comparison results all indicate that the first consumption difference message and the first consumption increment message of the recording material corresponding to any job type are consistent with each other, and when the quantity n of eighth comparison results all indicate that the outputted page quantity difference message and the page quantity increment messages respectively corresponding to any job type are consistent with each other, it is determined that the information processing apparatus may meet expectation.

In embodiments of the present disclosure, when the information processing apparatus meets expectation, it indicates that the data storage and/or reading functions of the information processing apparatus may be normal, such that the total consumption amount of the recording material in the consumable may be calculated using the data provided by the information processing apparatus according to the method shown in FIG. 2 in embodiments of the present disclosure; and when the information processing apparatus does not meet expectation, it indicates that the data storage and/or reading function of the information processing apparatus may be abnormal, such that the total consumption amount of the recording material in the consumable calculated by the method shown in FIG. 2 using the data provided by the information processing apparatus may be inaccurate.

Exemplarily, initial outputted page quantity respectively corresponding to the n job types obtained by the image-forming apparatus may be 11 pages, 12 pages, 15 pages, 16 pages, and 17 pages respectively; the single-job outputted page quantities of corresponding job types may be 1 page, 2 pages, 3 pages, 4 pages, and greater than 4 pages; and the page quantity increment message corresponding to current output job may be 2 pages. Therefore, the basic outputted pages respectively corresponding to the n job types may be determined to be 11 pages, 14 pages, 15 pages, 16 pages, and 17 pages, respectively. It is assumed that the outputted page quantities corresponding to the n job types provided by the information processing apparatus may be 11 pages, 12 pages, 15 pages, 16 pages, and 17 pages respectively. The basic outputted page quantity and the outputted page quantity corresponding to each job type in the n job types may be compared to obtain multiple comparison results. The multiple comparison results may be respectively "consistent", "inconsistent", "consistent", "consistent", and "consistent". It is determined that there are inconsistent comparison results, and the information processing apparatus may not meet expectation.

It should be noted that, in order to detect whether the information processing apparatus meets expectation, only one of two implementation manners mentioned above, that is, the manner "1" and the manner "2", may be configured to detect whether the information processing apparatus meets expectation; or both implementation manners may be configured to detect whether the information processing apparatus meets expectation sequentially. For example, for detecting whether the information processing apparatus meets expectation by using two implementation manners sequentially, one of the manners may be configured to detect whether the information processing apparatus meets expectation first. If the detection result is that the information processing apparatus does not meet expectation, there is no need to use another manner to detect whether the information processing apparatus meets expectation, and the information processing apparatus may be directly determined to be not meet expectation, thereby saving detection steps.

When only one of the implementation manners is configured to detect whether the information processing apparatus meets expectation, after the implementation manner described in the manner "1" is configured to detect that the information processing apparatus meets expectation, the image-forming apparatus may then execute above-mentioned S201 to obtain the first consumption messages of the recording material respectively corresponding to the n job types. That is, after the information processing apparatus is detected to meet expectation by the implementation manner described in the manner "1", the image-forming apparatus may send the page quantity increment message corresponding to current output job and/or the first consumption increment message of the recording material corresponding to current output job to the information processing apparatus, that is, S406 shown in FIG. 4. After the information processing apparatus is detected to not meet expectation by using such implementation manner, the image-forming apparatus may not execute above-mentioned S201. Optionally, the image-forming apparatus may report an error at this point. When the information processing apparatus is detected to meet expectation by the implementation manner described in the manner "2", the image-forming apparatus may execute above-mentioned S203 again, and determine the total consumption message of the recording material in the consumable according to the first consumption messages of the recording material respectively corresponding to the n job types and the second consumption messages of the recording material respectively corresponding to the n job types. After such manner detects that the information processing apparatus does not meet expectation, the image-forming apparatus may not execute above-mentioned S203.

It should be noted that since the information processing apparatus is used in conjunction with the consumable, such as by being installed on the consumable, the detection of whether the information processing apparatus meets the expectation may be performed through at least one of manner "1" and manner "2" mentioned above. This should also be understood as detecting whether the consumable corresponding to the information processing apparatus meets the expectation. Specifically, when manner "1" is used to determine that the information processing apparatus meets the expectation, it is determined that the corresponding consumable meets the expectation. When manner "1" is used to determine that the information processing apparatus does not meet the expectation, it is determined that the corresponding consumable does not meet the expectation. Similarly, when manner "2" is used to determine that the information processing apparatus meets the expectation, it is determined that the corresponding consumable meets the expectation, and when manner "2" is used to determine that the information processing apparatus does not meet the expectation, it is determined that the corresponding consumable does not meet the expectation.

FIG. 3 illustrates another flowchart of an estimation method of a recording material provided by exemplary embodiments of the present disclosure. The above-mentioned method may be applied to the information processing apparatus. As shown in FIG. 3, the method may include the following exemplary steps.

At S301, the consumption message obtaining instruction sent by the image-forming apparatus may be received.

In embodiments of the present disclosure, the information processing apparatus may directly or indirectly receive the consumption message obtaining instruction sent by the image-forming apparatus. The information processing apparatus indirectly may receive the consumption message obtaining instruction sent by the image-forming apparatus; for example, the information processing apparatus may receive the consumption message obtaining instruction sent by the image-forming apparatus through a relay configured between the image-forming apparatus and the information processing apparatus.

At S302, according to the consumption message obtaining instruction, the outputted page quantity messages respectively corresponding to the n job types and the first consumption messages of the recording material respectively corresponding to the n job types may be sent to the image-forming apparatus.

The description of the outputted page quantity respectively corresponding to the n job types and the first consumption messages of the recording material respectively corresponding to the n job types may refer to above-mentioned S201, which may not be described in detail herein.

As an optional implementation manner, the outputted page quantity messages respectively corresponding to the n job types and/or the first consumption messages of the recording material respectively corresponding to the n job types may be also configured to determine whether the information processing apparatus meets expectation.

That is, the image-forming apparatus may detect whether the information processing apparatus meets expectation through the outputted page quantity messages respectively corresponding to the n job types and/or the first consumption messages of the recording material respectively corresponding to the n job types, thereby ensuring the accuracy of determined total consumption message of the recording material in the consumable.

The description of how the image-forming apparatus exemplarily detects whether the information processing apparatus meets expectation based on the outputted page quantity messages respectively corresponding to the n job types and/or the first consumption messages of the recording material respectively corresponding to the n job types may refer to above-mentioned description of determining whether the information processing apparatus meets expectation, which may not be described in detail herein. It should be noted that in a specific implementation manner, the information processing apparatus may also send the outputted page quantity messages respectively corresponding to the n job types and the first consumption messages of the recording material respectively corresponding to the n job types to the image-forming apparatus based on specific conditions instead of the consumption message instruction obtained. Exemplarily, the information processing apparatus may update the initial outputted page quantity messages respectively corresponding to the n job types and obtain the outputted page quantity messages respectively corresponding to the n job types; obtained outputted page quantity messages respectively corresponding to the n job types may be automatically sent to the image-forming apparatus; the information processing apparatus may update the initial first consumption messages of the recording material respectively corresponding to the n job types and obtain the first consumption messages of the recording material respectively corresponding to the n job types; and obtained first consumption messages of the recording material respectively corresponding to the n job types may be automatically sent to the image-forming apparatus.

Before S302, the method may further include receiving the page quantity increment message corresponding to current output job and the first consumption increment message of the recording material corresponding to current output job which are sent by the image-forming apparatus. Exemplarily, the following describes how the information processing apparatus determines the outputted page quantity messages respectively corresponding to the n job types based on the received page quantity increment message corresponding to current output job, and how the information processing apparatus determines the first consumption messages of the recording material corresponding to the n job types based on the received first consumption increment message corresponding to current output job by referring to FIG. 4.

The following first describes how the information processing apparatus determines the outputted page quantity message corresponding to the n job types according to the received page quantity increment message corresponding to current output job, which may, for example, include the following exemplary steps.

At S407, the information processing apparatus may determine the first job type corresponding to the page quantity increment message according to the received page quantity increment message.

It should be understood that when the image-forming apparatus sends the page quantity increment message corresponding to current output job to the information processing apparatus, the information processing apparatus may directly determine the job type corresponding to current output job based on the page quantity increment message corresponding to current output job. Exemplarily, the page quantity increment message received by the information processing apparatus may be 2 pages; that is, current output job may print out 2 pages, and corresponding first job type may be a 2-page job type.

At S408, the information processing apparatus may obtain the initial outputted page quantity message corresponding to the first job type or the associated message of the initial outputted page quantity message.

The initial outputted page quantity message or the associated message of the initial outputted page quantity message of corresponding job types in the n job types may be stored in the first preset storage device, and the first preset storage device may be configured in the information processing apparatus or an external device connected to the information processing apparatus. The information processing apparatus may, exemplarily, obtain the initial outputted page quantity message corresponding to the first job type or the associated message corresponding to the initial outputted page quantity message from the first preset storage device. The associated message corresponding to the initial outputted page quantity message corresponding to the first job type may refer to the result calculated and generated according to the preset algorithm based on the initial outputted page quantity corresponding to the first job type.

Obviously, the information processing apparatus may also first obtain the initial outputted page quantity message or the associated message of the initial outputted page quantity message corresponding to the n job types, and then S407 may be executed. It may be understood that the initial outputted page quantity message or the associated message of the initial outputted page quantity message corresponding to the n job types may include the initial outputted page quantity message or the associated message of the initial outputted page quantity message corresponding to the first job type. That is, the exemplary step of obtaining the initial outputted page quantity message or the associated message of the initial outputted page quantity message corresponding to the n job types may include S408.

At S410, the information processing apparatus may determine the outputted page quantity message corresponding to the first job type according to the received page quantity increment message.

That is, the information processing apparatus may update the initial outputted page quantity message corresponding to the first job type according to the received page quantity increment message or update the conversion message of the initial outputted page quantity message corresponding to the first job type according to the received page quantity increment message and may obtain the first consumption message of the recording material corresponding to the first job type.

Determining the outputted page quantity message corresponding to the first job type according to the received page quantity increment message by the information processing apparatus may include the following manners.

For the manner "d", the information processing apparatus may obtain the initial outputted page quantity message corresponding to the first job type, directly add the page quantity increment message corresponding to the first job type on the basis of the initial outputted page quantity message corresponding to the first job type and may obtain the outputted page quantity message corresponding to the first job type. Exemplarily, the initial outputted page quantity message corresponding to the first job type may be 3000 pages, and the page quantity increment message corresponding to the first job type may be 2 pages, such that the outputted page quantity message corresponding to the first job type may be calculated to be 3002 pages.

For the manner “e”, the information processing apparatus may obtain the associated message of the initial outputted page quantity message corresponding to the first job type, and convert the associated message of the initial outputted page quantity message corresponding to the first job type into the initial outputted page quantity message according to the preset first algorithm; and the initial outputted page quantity message obtained by the conversion may be updated according to above-mentioned page quantity increment message to obtain the outputted page quantity message corresponding to the first job type. For example, the page quantity increment message corresponding to the first job type may be directly added on the initial outputted page quantity message corresponding to the first job type obtained by conversion to obtain the outputted page quantity message corresponding to the first job type.

For the manner “f”, the information processing apparatus may obtain the associated message of the initial outputted page quantity message corresponding to the first job type, and convert the received page quantity increment message corresponding to the first job type into the associated message corresponding to above-mentioned page quantity increment message according to the preset second algorithm; the associated message of the initial outputted page quantity message of the first job type may be updated according to the associated message corresponding to the converted page quantity increment message, and the associated message of the outputted page quantity message corresponding to the first job type may be obtained; and furthermore, the outputted page quantity message corresponding to the first job type may be obtained according to the associated message of the outputted page quantity message corresponding to the first job type. For example, the associated message of the page quantity increment message corresponding to the first job type may be directly added on the associated message of the initial outputted page quantity message corresponding to the first job type to obtain the associated message of the outputted page quantity message corresponding to the first job type; and according to the preset algorithm, the obtained associated message of the outputted page quantity message corresponding to the first job type may be converted into the outputted page quantity message corresponding to the first job type. The associated message of the initial outputted page quantity message corresponding to the first job type may be the result calculated and generated according to the associated message of the initial outputted page quantity message corresponding to the first job type according to the preset algorithm.

It should be noted that the above describes that the information processing apparatus may determine the initial outputted page quantity message that needs to be adjusted in the n job types according to the received page quantity increment message, and then adjust the outputted page quantity corresponding to the first job type according to the page quantity increment message. The outputted page quantity messages respectively corresponding to the other job types in the n job types may not need to be adjusted and may be consistent with the initial outputted page quantity messages respectively corresponding to the other job types in the n job types previously provided to the image-forming apparatus.

The following describes how the information processing apparatus may determine the first consumption messages of the recording material respectively corresponding to the n job types according to the received page quantity increment message and the first consumption increment message corresponding to current output job, which may, for example, include the following exemplary steps.

At S407, the information processing apparatus may determine the first job type corresponding to the page quantity increment message according to the received page quantity increment message.

S407 herein may be consistent with above-mentioned S407, which may refer to the description of above-mentioned S407 and may not be described in detail herein.

At S409, the information processing apparatus may obtain the initial first consumption message of the recording material corresponding to the first job type or the associated message of the initial first consumption message.

The initial first consumption messages or the associated message of the initial first consumption messages of the recording material of corresponding job types in the n job types may be stored in the second preset storage device; and the second preset storage device may be configured in the information processing apparatus or an external device connected to the information processing apparatus. The information processing apparatus may, for example, obtain the initial first consumption message of the recording material corresponding to the first job type or the associated message corresponding to the initial first consumption messages from the second preset storage device. The associated message of the initial first consumption message corresponding to the first job type may refer to the result calculated and generated according to the preset algorithm based on the initial first consumption message of the recording material corresponding to the first job type.

Obviously, the information processing apparatus may also first obtain the initial first consumption messages of the recording material corresponding to the n job types or the associated message of the initial first consumption messages, and then S407 may be executed. It may be understood that the initial first consumption messages or the associated message of the initial first consumption messages of the recording material corresponding to the n job types may include the initial first consumption messages or the associated message of the initial first consumption message of the recording material corresponding to the first job type. That is, the exemplary step of obtaining the initial first consumption messages of the recording material corresponding to the n job types or the associated message of the initial first consumption messages may include S409.

Embodiments of the present disclosure may not limit the execution order of S408 and S409.

At S411, the information processing apparatus may determine the first consumption message of the recording material corresponding to the first job type according to above-mentioned first consumption increment message.

That is, the information processing apparatus may update the initial first consumption message of the recording material corresponding to the first job type according to the received first consumption increment message, or update the associated message of the initial first consumption message of the recording material corresponding to the first job type according to the received first consumption increment message; and may obtain the first consumption message of the recording material corresponding to the first job type.

Determining the first consumption message of the recording material corresponding to the first job type by the information processing apparatus according to the first consumption increment message may include the following exemplary steps.

For the manner "g", the information processing apparatus may obtain the initial first consumption message of the recording material corresponding to the first job type, directly add the first consumption increment message of the recording material corresponding to the first job type on the basis of the initial first consumption message of the recording material corresponding to the first job type and may obtain the first consumption message of the recording material corresponding to the first job type. Exemplarily, the initial first consumption message of the recording material corresponding to the first job type may be 7740 thousand points, and the first consumption increment message of the recording material corresponding to the first job type may be 774 thousand points, such that the first consumption message of the recording material corresponding to the first job type may be calculated to be 8514 thousand points. Exemplarily, the initial first consumption message of the recording material corresponding to the first job type may be 200 mg, and the first consumption increment message of the recording material corresponding to the first job type may be 17 mg, such that the first consumption message of the recording material corresponding to the first job type may be calculated to be 217 mg.

For the manner "h", the information processing apparatus may obtain the associated message of the initial first consumption message of the recording material corresponding to the first job type, convert the associated message of the initial first consumption message of the recording material corresponding to the first job type into the initial first consumption messages of the recording material according to the preset third algorithm, update the initial first consumption messages of the recording material obtained by the conversion according to the received first consumption increment message of the recording material, and may obtain the first consumption message of the recording material corresponding to the first job type. For example, the first consumption increment message of the recording material corresponding to the first job type may be added to the initial first consumption message of the recording material corresponding to the first job type to obtain the first consumption message of the recording material corresponding to the first job type.

For the manner "i", the associated message of the initial first consumption message of the recording material corresponding to the first job type may be obtained; according to the preset fourth algorithm, the first consumption increment message of the recording material corresponding to the first job type received may be converted into the associated message of the first consumption increment message of the recording material; the associated message of the initial first consumption messages of the recording material of the first job type may be updated according to the associated message of the first consumption increment message obtained by the conversion; the associated message of the first consumption message of the recording material corresponding to the first job type may be obtained; furthermore, the first consumption message of the recording material corresponding to the first job type may be obtained according to the associated message of the first consumption message of the recording material corresponding to the first job type. For example, the associated message of the first consumption increment message of the recording material corresponding to the first job type may be directly added on the basis of the associated message of the initial first consumption message of the recording material corresponding to the first job type to obtain the associated message of the first consumption message of the recording material corresponding to the first job type; and according to the preset algorithm, the obtained associated message of the first consumption message of the recording material corresponding to the first job type may be converted into the first consumption message of the recording material corresponding to the first job type. The associated message of the initial first consumption message corresponding to the first job type may be the result calculated and generated according to the associated message of the initial first consumption message corresponding to the first job type according to the preset algorithm.

It should be noted that, as disclosed above, the information processing apparatus may determine the initial first consumption messages that needs to be adjusted in n job types according to the received first consumption increment message, and then adjust the first consumption message corresponding to the first job type according to the first consumption increment message. The first consumption messages respectively corresponding to the other job types in the n job types may not need to be adjusted and may be consistent with the first consumption messages respectively corresponding to the other job types in the n job types previously provided to the image-forming apparatus.

Embodiments of the present disclosure may not limit the execution order of S410 and S411.

According to the solution provided in the above embodiment, it should be noted that, since the information processing apparatus is used in conjunction with the consumable by being installed on it, the information that the image-forming apparatus obtains from the consumable, such as the first consumption messages of the recording material corresponding to n job types, the outputted page quantity messages respectively corresponding to the n job types, the initial first consumption messages of the recording material corresponding to n job types, the initial outputted page quantity message corresponding to the n job types, and the serial number of the information processing apparatus, is all provided by the information processing apparatus of the consumable. The information that the image-forming apparatus sends to the consumable, such as the page quantity increment message and the first consumption increment message of the recording material corresponding to the current output job, is all received by the information processing apparatus of the consumable.

It should be additionally explained that, when there is a many-to-one relationship between the consumables and the information processing apparatus, for example, when the image-forming apparatus install six consumables, and one of the consumables is equipped with an information processing apparatus, this information processing apparatus handles the communication between the six consumables and the image-forming apparatus. For example, the image-forming apparatus may obtain the initial first consumption messages of the recording material corresponding to n job types for each of the six consumables, as well as the initial outputted page quantity message corresponding to the n job types for each of the six consumables from this information processing apparatus. After the image-forming apparatus completes the current output job, it sends the page quantity increment message and the first consumption increment message of the recording material corresponding to the current output job corresponding to the six consumables to the information processing apparatus. The information processing apparatus determines the updated output page message for each of the six consumables based on the received page quantity increment message. It also determines the updated first consumption message of the recording material for each of the six consumables based on the received first consumption increment message. Furthermore, the information processing apparatus receives a consumption message obtaining instruction sent by the image-forming apparatus and based on this instruction, sends the updated outputted page quantity messages and the updated first consumption messages of the recording material for each of the six consumables corresponding to n job types back to the image-forming apparatus.

Referring to FIG. 5, FIG. 5 illustrates another structural schematic of an image-forming apparatus provided by exemplary embodiments of the present disclosure. At least one consumable may be detachably installed in the image-forming apparatus, and an information processing apparatus may be installed on at least one consumable, the image-forming apparatus can communicate with the information processing apparatus. As shown in FIG. 5, the image-forming apparatus may further include the following units:

an obtaining unit 501, configured to obtain the first consumption messages of the recording material respectively corresponding to n job types from the information processing apparatus, where the first consumption messages may be configured to determine the consumption amount message of the recording material consumed by the outputted pages of corresponding job types, n may be an integer greater than 1, and the outputted page quantity by a single job respectively corresponding to the n job types may be different; and further configured to obtain above-mentioned second consumption messages of the recording material respectively corresponding to the n job types, where above-mentioned second consumption message may be configured to determine the consumption amount message of the recording material consumed by corresponding job types except the recording material consumed by the outputted pages; and a processing unit 502, configured to determine the total consumption message of the recording material in the consumable according to above-mentioned first consumption messages of the recording material respectively corresponding to the n job types and above-mentioned second consumption messages of the recording material respectively corresponding to the n job types.

As an optional implementation manner, the obtaining unit 501 may be further configured to obtain above-mentioned completed job quantities respectively corresponding to the n job types; obtain the preset additional consumption message of the recording material respectively corresponding to the n job types, where additional consumption message of the recording material corresponding to any job type may be determined based on the consumption amount of consumed recording material except the recording material consumed by the outputted pages of the single job corresponding to such job type when the output job of such job type is performed once; and according to above-mentioned preset additional consumption message of the recording material respectively corresponding to the n job types and above-mentioned completed job quantities respectively corresponding to the n job types, determine the second consumption messages of the recording material respectively corresponding to the n job types.

As an optional implementation manner, the obtaining unit 501 may be also configured to obtain above-mentioned outputted page quantity messages respectively corresponding to the n job types from above-mentioned information processing apparatus; and determine above-mentioned completed job quantities respectively corresponding to the n job types according to above-mentioned obtained outputted page quantity messages respectively corresponding to the n job types and above-mentioned single-job outputted page quantity corresponding to the n job types.

As an optional implementation manner, the obtaining unit 501 may be also configured to obtain above-mentioned initial first consumption messages of the recording material respectively corresponding to the n job types from above-mentioned information processing apparatus and obtain above-mentioned initial outputted page quantity messages respectively corresponding to the n job types from above-mentioned information processing apparatus.

As an optional implementation manner, the image-forming apparatus may further include:

a sending unit 503, configured to send the page quantity increment message corresponding to current output job and the first consumption increment message of the recording material corresponding to current output job to the information processing apparatus, where the page quantity increment message corresponding to current output job may include the outputted page quantity message corresponding to current output job, and above-mentioned first consumption increment message may include the consumption amount message of the recording material consumed by the outputted pages of current output job.

As an optional implementation manner, the obtaining unit 501 may be configured to: after completing current output job, obtain above-mentioned first consumption messages of the recording material respectively corresponding to the n job types from above-mentioned information processing apparatus.

The obtaining unit 501 may be configured to: after completing current output job, obtain above-mentioned outputted page quantity messages respectively corresponding to the n job types from above-mentioned information processing apparatus.

As an optional implementation manner, the processing unit 502 may be further configured to:

- determine whether the information processing apparatus meets expectation according to above-mentioned first consumption messages of the recording material respectively corresponding to the n job types, above-mentioned initial first consumption messages respectively corresponding to the n job types, above-mentioned first consumption increment message, and above-mentioned page quantity increment message; or
- determine whether the information processing apparatus meets expectation according to above-mentioned outputted page quantity messages respectively corresponding to the n job types, above-mentioned initial outputted page quantity messages respectively corresponding to the n job types, and above-mentioned page quantity increment message; or
- determine whether the information processing apparatus meets expectation according to above-mentioned first consumption messages of the recording material respectively corresponding to the n job types, above-mentioned initial first consumption messages respectively corresponding to the n job types, above-mentioned first consumption increment message, above-mentioned outputted page quantity messages respectively corresponding to the n job types, above-mentioned initial outputted page quantity messages respectively corresponding to the n job types, and above-mentioned page quantity increment message.

The processing unit 502 may be also configured to: if above-mentioned information processing apparatus meets expectation, determine the total consumption message of the recording material in above-mentioned consumable according to above-mentioned first consumption messages of the recording material respectively corresponding to the n job types and above-mentioned second consumption messages of the recording material respectively corresponding to the n job types.

Embodiments of the present disclosure further provides a consumable chip. The consumable may be configured to be installed on a consumable, and the consumable may be detachably installed on the image-forming apparatus. The consumable chip may include a control unit. The control unit may be configured to:

send the outputted page quantity messages respectively corresponding to n job types and the first consumption messages of the recording material respectively corresponding to the n job types to the image-forming apparatus.

Above-mentioned outputted page quantity messages respectively corresponding to the n job types and above-mentioned first consumption messages of the recording material respectively corresponding to the n job types may be configured to determine the total consumption message of the recording material in above-mentioned consumable; n may be an integer greater than 1; the single-job outputted page quantities respectively corresponding to above-mentioned n job types may be different.

As an optional implementation manner, above-mentioned outputted page quantity messages respectively corresponding to the n job types, and/or the first consumption messages of the recording material respectively corresponding to the n job types may be also configured to determine whether above-mentioned consumable chip meets expectation.

As an optional implementation manner, the control unit may be also configured to:

- receive the page quantity increment message corresponding to current output job and the first consumption increment message of the recording material corresponding to current output job sent by above-mentioned image-forming apparatus;
- determine above-mentioned outputted page quantity messages respectively corresponding to the n job types respectively according to the received page quantity increment message; and
- determine above-mentioned first consumption messages of the recording material corresponding to the n job types respectively according to above-mentioned received first consumption increment message and above-mentioned page quantity increment message.

As an optional implementation manner, the control unit may be exemplarily configured to:

- determine the first job type corresponding to above-mentioned page quantity increment message according to the received aforementioned page quantity increment message;
- obtain the initial outputted page quantity message corresponding to above-mentioned first job type or the associated message corresponding to above-mentioned initial outputted page quantity message; and
- determine the outputted page quantity message corresponding to above-mentioned first job type according to above-mentioned page quantity increment message and the initial outputted page quantity message corresponding to above-mentioned first job type, or determine the outputted page quantity message corresponding to above-mentioned first job type according to the associated message of above-mentioned page quantity increment message and the initial outputted page quantity message corresponding to above-mentioned first job type.

As an optional implementation manner, the control unit may be exemplarily configured to:

- obtain the initial outputted page quantity message corresponding to above-mentioned first job type or the associated message corresponding to above-mentioned initial outputted page quantity message from the first preset storage device, where above-mentioned first preset storage device may be configured in above-mentioned consumable chip or an external device connected to above-mentioned consumable chip.

As an optional implementation manner, the control unit may be exemplarily configured to:

- determine the first job type corresponding to above-mentioned page quantity increment message according to above-mentioned received aforementioned page quantity increment message;
- obtain the initial first consumption messages of the recording material corresponding to above-mentioned first job type or the associated message corresponding to above-mentioned initial first consumption messages; and
- determine the first consumption messages of the recording material corresponding to above-mentioned first job type according to above-mentioned first consumption increment message and the initial first consumption messages corresponding to above-mentioned first job type or determine the first consumption messages of the recording material corresponding to above-mentioned first job type according to the associated message of above-mentioned first consumption increment message and the initial first consumption messages corresponding to above-mentioned first job type.

As an optional implementation manner, the control unit may be exemplarily configured to:

- obtain above-mentioned initial first consumption messages respectively corresponding to the n job types or above-mentioned associated message corresponding to the initial first consumption messages of the recording material respectively corresponding to the n job types from the second preset storage device, where above-mentioned second preset storage device may be configured in above-mentioned consumable chip or an external device connected to above-mentioned consumable chip.

As an optional implementation manner, the control unit may be exemplarily configured to:

- determine the first job type corresponding to above-mentioned page quantity increment message according to the received aforementioned page quantity increment message;
- obtain the associated message of the initial outputted page quantity message corresponding to above-mentioned first job type;
- convert the associated message of the initial outputted page quantity message corresponding to above-mentioned first job type into the initial outputted page quantity message according to the preset first algorithm; and update converted initial outputted page quantity message according to above-mentioned page quantity increment message to obtain the outputted page quantity message corresponding to above-mentioned first job type.

As an optional implementation manner, the control unit may be exemplarily configured to:

determine the first job type corresponding to above-mentioned page quantity increment message according to the received page quantity increment message;

obtain the associated message of the initial outputted page quantity message corresponding to above-mentioned first job type;

convert the received page quantity increment message into the associated message corresponding to above-mentioned page quantity increment message according to the preset second algorithm;

update the associated message of the initial outputted page quantity message of above-mentioned first job type according to the associated message corresponding to above-mentioned page quantity increment message, and obtain the associated message of the outputted page quantity message corresponding to above-mentioned first job type; and obtain the outputted page quantity message corresponding to above-mentioned first job type according to the associated message of the outputted page quantity message corresponding to above-mentioned first job type.

As an optional implementation manner, the control unit may be exemplarily configured to:

determine the first job type corresponding to above-mentioned page quantity increment message according to above-mentioned page quantity increment message received;

obtain the associated message of the initial first consumption messages corresponding to above-mentioned first job type;

convert the associated message of the initial first consumption messages corresponding to above-mentioned first job type into the initial first consumption messages according to the preset third algorithm; and update converted initial first consumption messages according to above-mentioned first consumption increment message and obtain the first consumption messages of the recording material corresponding to above-mentioned first job type.

As an optional implementation manner, the control unit may be exemplarily configured to:

determine the first job type corresponding to above-mentioned page quantity increment message according to the received aforementioned page quantity increment message;

obtain the associated message of the initial first consumption messages of the recording material corresponding to above-mentioned first job type;

convert the received first consumption increment message corresponding to current output job into the associated message corresponding to above-mentioned first consumption increment message according to the preset fourth algorithm;

update the associated message of the initial first consumption messages of the recording material corresponding to above-mentioned first job type according to the associated message corresponding to above-mentioned first consumption increment message, and obtain the associated message of the first consumption messages of the recording material corresponding to above-mentioned first job type; and obtain the first consumption messages corresponding to above-mentioned first job type according to the associated message of above-mentioned first consumption message.

As an optional implementation manner, the consumable chip may further include:

the second communication interface for sending the outputted page quantity messages respectively corresponding to the n job types and/or first consumption messages of the recording material respectively corresponding to the n job types to the image-forming apparatus.

As an optional implementation manner, the consumable chip may further include: a storage unit for storing the associated message of the outputted page quantity messages respectively corresponding to the n job types, and/or above-mentioned associated message of the first consumption messages of the recording material respectively corresponding to the n job types.

Embodiments of the present disclosure further provides an information processing apparatus, including:

a first sending module, configured to send outputted page quantity messages respectively corresponding to n job types and first consumption messages of the recording material respectively corresponding to the n job types to the image-forming apparatus, where:

the outputted page quantity messages respectively corresponding to the n job types and the first consumption messages of the recording material respectively corresponding to the n job types are configured to determine a total consumption message of the recording material in a consumable; n is an integer greater than 1; and single-job outputted page quantities respectively corresponding to n job types are different.

As an optional implementation manner, the outputted page quantity messages respectively corresponding to the n job types and/or the first consumption messages of the recording material respectively corresponding to the n job types are further configured to determine whether the consumable meets expectation.

As an optional implementation manner, the information processing apparatus further including:

a first receiving module, configured to receive a page quantity increment message corresponding to current output job and a first consumption increment message of the recording material corresponding to current output job sent by the image-forming apparatus.

As an optional implementation manner, the information processing apparatus further including:

a page quantity updating module, configured to determine the outputted page quantity messages respectively corresponding to the n job types according to the page quantity increment message received.

As an optional implementation manner, the information processing apparatus further including:

a consumption message updating module, configured to determine the first consumption messages of the recording material respectively corresponding to the n job types respectively according to the first consumption increment message received.

As an optional implementation manner, where the page quantity updating module is configured to:

determine a first job type corresponding to the page quantity increment message according to the page quantity increment message received;

obtain an initial outputted page quantity message or an associated message of the initial outputted page quantity message corresponding to the first job type; and determine an outputted page quantity message corresponding to the first job type according to the page quantity increment message and the initial outputted page quantity message corresponding to the first job type; or determine an outputted page quantity message corresponding to the first job type according to the page quantity increment message and the associated message of the initial outputted page quantity message corresponding to the first job type.

As an optional implementation manner, where the page quantity updating module is configured to:

obtain the initial outputted page quantity message or the associated message of the initial outputted page quantity message corresponding to the first job type from a first preset storage device, where the first preset storage device is configured in information processing apparatus associated with the consumable or an external device connected to the information processing apparatus.

As an optional implementation manner, where the consumption message updating module is configured to:

determine a first job type corresponding to the page quantity increment message according to the page quantity increment message received;

obtain an initial first consumption message of the recording material corresponding to the first job type or an associated message corresponding to the initial first consumption message; and determine a first consumption message of the recording material corresponding to the first job type according to the first consumption increment message and the initial first consumption message corresponding to the first job type; or determine a first consumption message of the recording material corresponding to the first job type according to the first consumption increment message and the associated message of the initial first consumption message corresponding to the first job type.

As an optional implementation manner, where the consumption message updating module is configured to:

obtain initial first consumption messages respectively corresponding to the n job types or associated messages corresponding to the initial first consumption messages of the recording material respectively corresponding to the n job types from a second preset storage device, where the second preset storage device is configured in information processing apparatus associated with the consumable or an external device connected to the information processing apparatus.

As an optional implementation manner, where the page quantity updating module is configured to:

determine a first job type corresponding to the page quantity increment message according to the page quantity increment message received;

obtain an associated message of an initial outputted page quantity message corresponding to the first job type;

according to a preset first algorithm, convert the associated message of the initial outputted page quantity message corresponding to the first job type into the initial outputted page quantity message; and according to the page quantity increment message, update the initial outputted page quantity message converted to obtain an outputted page quantity message corresponding to the first job type.

As an optional implementation manner, where the page quantity updating module is configured to:

determine a first job type corresponding to the page quantity increment message according to the page quantity increment message received;

obtain an associated message of an initial outputted page quantity message corresponding to the first job type;

according to a preset second algorithm, convert the page quantity increment message received into an associated message corresponding to the page quantity increment message;

according to the associated message corresponding to the page quantity increment message, update the associated message of the initial outputted page quantity message corresponding to the first job type to obtain an associated message of the outputted page quantity message corresponding to the first job type; and obtain an outputted page quantity message corresponding to the first job type according to the associated message of the outputted page quantity message corresponding to the first job type.

As an optional implementation manner, where the consumption message updating module is configured to:

determine a first job type corresponding to the page quantity increment message according to the page quantity increment message received;

obtain an associated message of an initial first consumption message corresponding to the first job type;

according to a preset third algorithm, convert the associated message of the initial first consumption message corresponding to the first job type into an initial first consumption messages; and according to the first consumption increment message, update the initial first consumption messages converted to obtain a first consumption message of the recording material corresponding to the first job type.

As an optional implementation manner, where the consumption message updating module is configured to:

determine a first job type corresponding to the page quantity increment message according to the page quantity increment message received;

obtain an associated message of an initial first consumption message of the recording material corresponding to the first job type;

according to a preset fourth algorithm, convert the first consumption increment message corresponding to current output job received into an associated message corresponding to the first consumption increment message;

according to the associated message corresponding to the first consumption increment message, update the associated message of the initial first consumption message of the recording material corresponding to the first job type to obtain an associated message of a first consumption message of the recording material corresponding to the first job type; and obtain a first consumption message corresponding to the first job type according to the associated message of the first consumption message.

As an optional implementation manner, the aforementioned first sending module is also configured to send the initial first consumption message of the recording material corresponding to each of the n job types and the initial outputted page quantity message corresponding to each of the n job types to the aforementioned image-forming apparatus.

As an optional implementation manner, the first sending module is also configured to send the identification message of the information processing apparatus to the image-forming apparatus.

In embodiments of the present disclosure, the first sending module, the first receiving module, the page quantity updating module, and the consumption message updating module may be implemented using a software manner or a hardware manner.

For example, the first sending module, the first receiving module, the page quantity updating module, and the consumption message updating module may be circuit units including devices such as FPGA (field programmable gate array), MCU (microcontroller unit), DSP (digital signal processor) and the like. The first sending module, the page quantity updating module, and the consumption message updating module may also realize functions by building a specific waveform generator circuit. The first receiving module, the page quantity updating module and the consumption message updating module may also realize corresponding functions by building a digital logic calculator. The specific implementation form of each module may be not further limited in the present disclosure.

In an optional implementation manner, the first sending module, the first receiving module, the page quantity updating module, and the consumption message updating module may be all included in above-mentioned consumable chip. Optionally, the first sending module, the first receiving module, the page quantity updating module, and the consumption message updating module may be all included in the control unit of above-mentioned consumable chip.

In an optional implementation manner, the first sending module, the first receiving module, the page quantity updating module, and the consumption message updating module may be other modules different from the consumable chip and configured on the consumable, which may not be limited in the present disclosure.

In an optional implementation manner, at least one of the first sending module, the first receiving module, the page quantity updating module, and the consumption message updating module may be an external module electrically connected to the consumable chip outside the consumable chip; and other units may be built into the first controller of the consumable chip. That is, above-mentioned consumable may include the consumable chip, and the external module electrically connected to the consumable chip.

In an optional implementation manner, the first sending module, the first receiving module, the page quantity updating module, and the consumption message updating module may be respectively configured on two or more different consumable chips that can communicate with each other. Optionally, the first sending module and the first receiving module may be configured on the first consumable chip; and the page quantity updating module and the consumption message updating module may be configured on the second consumable chip. After receiving the page quantity increment message corresponding to current output job and the first consumption increment message of the recording material corresponding to current output job sent by the image-forming apparatus, the first receiving module of the first consumable chip may forward the page quantity increment message corresponding to current output job and the first consumption increment message of the recording material corresponding to current output job sent by the image-forming apparatus to the second consumable chip; the page quantity updating module of the second consumable chip may determine the outputted page quantity messages respectively corresponding to the n job types according to the received page quantity increment message; and the consumption message updating module of the second consumable chip may determine the first consumption messages of the recording material respectively corresponding to the n job types according to the received first consumption increment message. After the second consumable chip sends the outputted page quantity messages respectively corresponding to the n job types determined by the page quantity updating module according to the received page quantity increment message and obtains the first consumption messages of the recording material respectively corresponding to the n job types determined by the consumption message updating module according to the received first consumption increment message to the first consumable chip, the first sending module of the first consumable chip sends the outputted page quantity messages respectively corresponding to the n job types and the first consumption messages of the recording material respectively corresponding to the n job types may be sent to the image-forming apparatus.

Obviously, those skilled in the art may also set the first sending module, the first receiving module, the page quantity updating module, and the consumption message updating module on different consumable chips by other manners, which may not be limited in the present disclosure.

It should be noted that specific description of the present disclosure may refer to the description of above-mentioned embodiments, which may not be described in detail for simplicity.

Corresponding to the above embodiments, embodiments of the present disclosure further provides a method for estimating recording material, applied to the aforementioned information processing apparatus, the method including:

sending outputted page quantity messages respectively corresponding to the n job types and first consumption messages of the recording material respectively corresponding to the n job types to the image-forming apparatus, where:

the outputted page quantity messages respectively corresponding to the n job types and the first consumption messages of the recording material respectively corresponding to the n job types are configured to determine a total consumption message of the recording material in a consumable; n is an integer greater than 1; and single-job outputted page quantities respectively corresponding to the n job types are different.

As an optional implementation manner, the outputted page quantity messages respectively corresponding to the n job types and/or the first consumption messages of the recording material respectively corresponding to the n job types are further configured to determine whether the consumable meets expectation.

As an optional implementation manner, before sending the outputted page quantity messages respectively corresponding to the n job types and the first consumption messages of the recording material respectively corresponding to the n job types to the image-forming apparatus, further including:

receiving a page quantity increment message corresponding to current output job and a first consumption increment message of the recording material corresponding to current output job sent by the image-forming apparatus.

As an optional implementation manner, the method further including:

determining the outputted page quantity messages respectively corresponding to the n job types according to the page quantity increment message received.

As an optional implementation manner, the method further including:

determining the first consumption messages of the recording material respectively corresponding to the n job types respectively according to the first consumption increment message received and the page quantity increment message.

As an optional implementation manner, where determining the outputted page quantity messages respectively corresponding to the n job types according to the page quantity increment message received includes:

determining a first job type corresponding to the page quantity increment message according to the page quantity increment message received;

obtaining an initial outputted page quantity message or an associated message of the initial outputted page quantity message corresponding to the first job type; and determining an outputted page quantity message corresponding to the first job type according to the page quantity increment message and the initial outputted page quantity message corresponding to the first job type; or determining an outputted page quantity message corresponding to the first job type according to the page quantity increment message and the associated message of the initial outputted page quantity message corresponding to the first job type.

As an optional implementation manner, where obtaining the initial outputted page quantity message or the associated message of the initial outputted page quantity message corresponding to the first job type includes:

obtaining the initial outputted page quantity message or the associated message of the initial outputted page quantity message corresponding to the first job type from a first preset storage device, where the first preset storage device is configured in information processing apparatus associated with the consumable or an external device connected to the information processing apparatus.

As an optional implementation manner, where determining the first consumption messages of the recording material respectively corresponding to the n job types respectively according to the first consumption increment message received and the page quantity increment message includes:

determining a first job type corresponding to the page quantity increment message according to the page quantity increment message received;

obtaining an initial first consumption message of the recording material corresponding to the first job type or an associated message corresponding to the initial first consumption message; and determining a first consumption message of the recording material corresponding to the first job type according to the first consumption increment message and the initial first consumption message corresponding to the first job type; or determining a first consumption message of the recording material corresponding to the first job type according to the first consumption increment message and the associated message of the initial first consumption message corresponding to the first job type.

As an optional implementation manner, where obtaining the initial first consumption message of the recording material corresponding to the first job type or the associated message corresponding to the initial first consumption message includes:

obtaining initial first consumption messages respectively corresponding to the n job types or associated messages corresponding to the initial first consumption messages of the recording material respectively corresponding to the n job types from a second preset storage device, where the second preset storage device is configured in information processing apparatus associated with the consumable or an external device connected to the information processing apparatus.

As an optional implementation manner, where determining the outputted page quantity messages respectively corresponding to the n job types according to the page quantity increment message received includes:

determining a first job type corresponding to the page quantity increment message according to the page quantity increment message received;

obtaining an associated message of an initial outputted page quantity message corresponding to the first job type;

according to a preset first algorithm, converting the associated message of the initial outputted page quantity message corresponding to the first job type into the initial outputted page quantity message; and according to the page quantity increment message, updating the initial outputted page quantity message converted to obtain an outputted page quantity message corresponding to the first job type.

As an optional implementation manner, where determining the outputted page quantity messages respectively corresponding to the n job types according to the page quantity increment message received includes:

determining a first job type corresponding to the page quantity increment message according to the page quantity increment message received;

obtaining an associated message of an initial outputted page quantity message corresponding to the first job type;

according to a preset second algorithm, converting the page quantity increment message received into an associated message corresponding to the page quantity increment message;

according to the associated message corresponding to the page quantity increment message, updating the associated message of the initial outputted page quantity message corresponding to the first job type to obtain an associated message of the outputted page quantity message corresponding to the first job type; and obtaining an outputted page quantity message corresponding to the first job type according to the associated message of the outputted page quantity message corresponding to the first job type.

As an optional implementation manner, where determining the first consumption messages of the recording material respectively corresponding to the n job types respectively according to the first consumption increment message received and the page quantity increment message includes:

determining a first job type corresponding to the page quantity increment message according to the page quantity increment message received;

obtaining an associated message of an initial first consumption message corresponding to the first job type;

according to a preset third algorithm, converting the associated message of the initial first consumption message corresponding to the first job type into an initial first consumption messages; and according to the first consumption increment message, updating the initial first consumption messages converted to obtain a first consumption message of the recording material corresponding to the first job type.

As an optional implementation manner, where determining the first consumption messages of the recording material respectively corresponding to the n job types respectively according to the first consumption increment message received and the page quantity increment message includes:

determining a first job type corresponding to the page quantity increment message according to the page quantity increment message received;

obtaining an associated message of an initial first consumption message of the recording material corresponding to the first job type;

according to a preset fourth algorithm, converting the first consumption increment message corresponding to current output job received into an associated message corresponding to the first consumption increment message;

according to the associated message corresponding to the first consumption increment message, updating the associated message of the initial first consumption message of the recording material corresponding to the first job type to obtain an associated message of a first consumption message of the recording material corresponding to the first job type; and obtaining a first consumption message corresponding to the first job type according to the associated message of the first consumption message.

Corresponding to above-mentioned embodiments, embodiments of the present disclosure may further provide a consumable.

Referring to FIG. 6, FIG. 6 illustrates a structural schematic of a consumable provided by exemplary embodiments of the present disclosure. As shown in FIG. 6, the consumable may include a housing; a developer containing portion which is in the housing and configured for containing the developer; and the information processing apparatus in above-mentioned embodiments.

Referring to FIG. 7, FIG. 7 illustrates a structural schematic of another consumable provided by exemplary embodiments of the present disclosure. As shown in FIG. 7, the consumable may further include a developer conveying unit for conveying developer based on one embodiment shown in FIG. 6.

Figure 8:
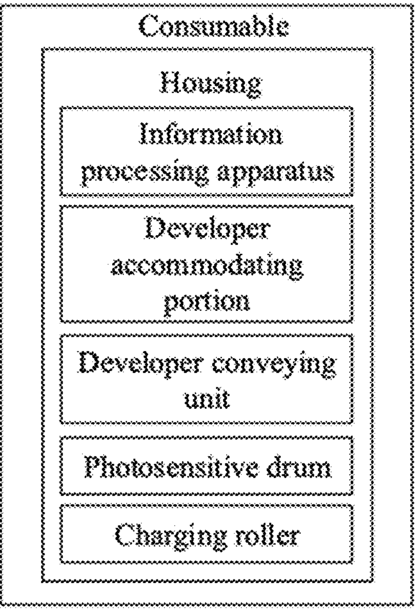
FIG. 8 illustrates another structural schematic of a consumable.

Referring to FIG. 8, FIG. 8 illustrates a structural schematic of another consumable provided by exemplary embodiments of the present disclosure. As shown in FIG. 8, the consumable may further include a photosensitive drum based on one embodiment shown in FIG. 7; and a charging roller for charging the photosensitive drum.

Figure 9:
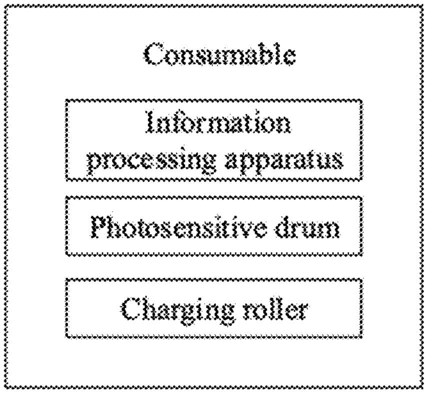
FIG. 9 illustrates another structural schematic of a consumable.

Referring to FIG. 9, FIG. 9 illustrates a structural schematic of another consumable provided by exemplary embodiments of the present disclosure. As shown in FIG. 9, the consumable may include a photosensitive drum; a charging roller for charging the photosensitive drum; and the information processing apparatus in above-mentioned embodiments.

It should be noted that specific description of the information processing apparatus in embodiments shown in FIGS. 6-9 may refer to the description of above-mentioned embodiments, which may not be described in detail for simplicity.

Figure 10:
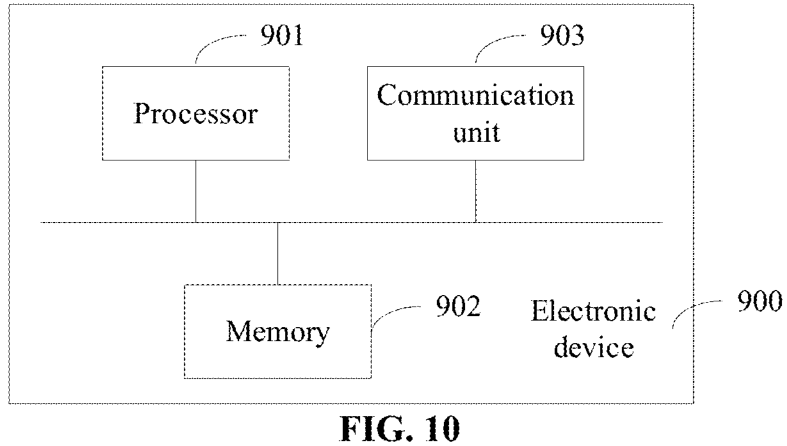
FIG. 10 illustrates a structural schematic of an electronic device provided by exemplary embodiments of the present disclosure.

Corresponding to above-mentioned embodiments, the present disclosure also provides an electronic device. FIG. 10 illustrates a structural schematic of an electronic device provided by exemplary embodiments of the present disclosure. An electronic device 900 may include a processor 901, a memory 902 and a communication unit 903. These components may communicate through one or more buses. Those skilled in the art may understand that the structure of the electronic device shown in FIG. 10 may not constitute a limitation on embodiments of the present disclosure. The electronic device may be a bus structure or a star structure; and may further include more or fewer components than shown in FIG. 6. Or certain components in FIG. 6 may be combined, or certain components in FIG. 6 may be arranged differently.

The communication unit 903 may be configured to establish a communication channel, such that the electronic device may communicate with other devices and receive user data sent by other devices or send user data to other devices.

The processor 901 may be the control center of the electronic device. The processor may use various interfaces and lines to connect various parts of the entire electronic device. The processor may run or execute software programs and/or modules stored in the memory 902 and call data stored in the memory to execute various functions of the electronic device and/or process data. The processor may include an integrated circuit (IC), for example, include a single packaged IC, or a plurality of packaged ICs with same or different functions connected to each other. For example, the processor 901 may include only a central processing unit (CPU). In embodiments of the present disclosure, the CPU may include a single computing core or multiple computing cores.

The memory 902 may be configured to store the execution instructions of the processor 901. The memory 902 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disks.

When the execution instructions in the memory 902 are executed by the processor 901, the electronic device 900 may execute some or all of the steps in one embodiment shown in FIG. 4.

In a specific implementation, the present disclosure also provides a computer storage medium. The computer storage medium may store a program; and when the program is executed, some or all of exemplary steps in embodiments of the method for estimating the recording material provided by the present disclosure may be implemented. The storage medium may be a magnetic disk, an optical disk, a read-only memory (ROM), a random access memory (RAM), or the like.

Embodiments of the present disclosure also provide a consumable. The consumable may include a housing, a developer accommodating portion and above-mentioned consumable chip. The developer accommodating portion may be located in the housing and configured to contain the developer. The consumable chip may be disposed on the housing.

In one embodiment, the consumable may further include a developer conveying unit configured to convey the developer.

In one embodiment, the consumable may further include a photosensitive drum and a charging roller, where the charging roller may be configured to charge the photosensitive drum.

Embodiments of the present disclosure also provide another consumable. The consumable may include a photosensitive drum, a charging roller and a consumable chip. The charging roller may be configured to charge the photosensitive drum. The consumable chip may be the consumable chip mentioned above.

In embodiments of the present disclosure, when determining the consumption message of the recording material, it needs not only to determine the consumption amount of the recording material consumed by the outputted pages corresponding to the n job types, but also to determine the second consumption message corresponding to the n job types, thereby improving the accuracy of the evaluation results of the consumption amount of the final recording material and further improving the user experience.

Those skilled in the art may clearly understand that the technology in embodiments of the present disclosure may be implemented by means of software plus a necessary general hardware platform. Based on such understanding, the technical solutions in embodiments of the present disclosure may be essentially or, in other words, the part contributing to the existing technology, may be embodied in the form of a software product. The computer software product may be stored in a storage medium, such as ROM/RAM, a disk, an optical disk or the like; and include several instructions for enabling a computer device (may be a personal computer, a server, a network device or the like) to execute the methods described in various embodiments or certain parts of embodiments of the present disclosure.

Compared with the existing technology, the technical solutions provided by the present disclosure may achieve at least the following beneficial effects.

According to the technical solutions provided by embodiments of the present disclosure, the first consumption messages of the recording material respectively corresponding to the n job types may be obtained from the information processing apparatus, where the first consumption messages of the recording material respectively corresponding to the n job types may be the consumption amount messages of the recording material consumed by outputted pages of corresponding job types; the second consumption messages of the recording material respectively corresponding to the n job types may be obtained; and the total consumption message of the recording material may be determined according to the first consumption messages of the recording material respectively corresponding to the n job types and the second consumption messages of the recording material respectively corresponding to the n job types. That is, in embodiments of the present disclosure, when estimation of the recording material is needed, the first consumption messages of the recording material respectively corresponding to the n job types may be obtained from the information processing apparatus; and the first consumption messages may be the consumption amount messages of the recording material consumed by outputted pages corresponding to the n job types. The recording material may not only be consumed when the print job is performed but also be consumed due to events, including OPC idling when the main control motor starts preheating before printing job, OPC idling generated by switching pages during job printing, and OPC idling before the main control motor stops when current job printing is completed. Therefore, in embodiments of the present disclosure, it needs not only to obtain the first consumption messages of the recording material respectively corresponding to the n job types, but also to obtain the second consumption messages of the recording material respectively corresponding to the n job types. The second consumption messages refer to the consumption amount messages of the recording material consumed respectively corresponding to the n job types except the recording material consumed by the outputted pages. Based on the first consumption messages and the second consumption messages of the recording material respectively corresponding to the obtained n job types, the total consumption message of the recording material in the consumable may be determined. That is, in embodiments of the present disclosure, when determining the consumption message of the recording material, it needs not only to determine the consumption amounts of the recording material consumed by the outputted page quantity corresponding to the n job types, but also to determine the second consumption messages respectively corresponding to the n job types, thereby improving the accuracy of the evaluation result of final total consumption amount of the recording material and improving the user experience. In addition, in embodiments of the present disclosure, printed page quantity messages respectively corresponding to various job types may be counted, and additional consumption amounts of the recording material respectively corresponding to various job types except the consumption amount of the recording material consumed by the outputted pages may be calculated and recorded. The additional consumption amount of the recording material obtained by calculation may be more accurate, which may improve the accuracy of the evaluation result of final consumption amount of the recording material and further improve the user experience.

In the present disclosure, same or similar parts between various embodiments may be referred to each other. In particular, since apparatus embodiments and terminal embodiments are basically similar to method embodiments, corresponding description may be relatively simple and referred to the description in method embodiments.

What is claimed is:

1. A recording material estimation method, comprising:

sending, to an image-forming apparatus, outputted page quantity messages respectively corresponding to n job types and first consumption messages of the recording material respectively corresponding to the n job types, wherein:

the outputted page quantity messages are the cumulative outputted page quantity messages respectively corresponding to the n job types updated after current job output is completed;

the first consumption messages are configured to determine the consumption amount message of the recording material consumed by the outputted page quantity of corresponding job types; and the outputted page quantity messages respectively corresponding to the n job types and the first consumption messages of the recording material respectively corresponding to the n job types are configured to determine a total consumption message of the recording material in a consumable; n is an integer greater than 1; single-job outputted page quantities respectively corresponding to the n job types are different; and the n job types are categorized based on number of pages outputted single job.

2. The method applied to an information processing apparatus according to claim 1, wherein:

the outputted page quantity messages respectively corresponding to the n job types and/or the first consumption messages of the recording material respectively corresponding to the n job types are further configured to determine whether the consumable meets expectation.

3. The method applied to an information processing apparatus according to claim 1, before sending the outputted page quantity messages respectively corresponding to the n job types and the first consumption messages of the recording material respectively corresponding to the n job types to the image-forming apparatus, further including:

receiving a page quantity increment message corresponding to current output job and a first consumption increment message of the recording material corresponding to current output job sent by the image-forming apparatus;

determining the outputted page quantity messages respectively corresponding to the n job types according to the page quantity increment message received; and determining the first consumption messages of the recording material respectively corresponding to the n job types respectively according to the first consumption increment message received and the page quantity increment message.

4. The method applied to an information processing apparatus according to claim 3, wherein determining the outputted page quantity messages respectively corresponding to the n job types according to the page quantity increment message received includes:

determining a first job type corresponding to the page quantity increment message according to the page quantity increment message received;

obtaining an initial outputted page quantity message or an associated message of the initial outputted page quantity message corresponding to the first job type; and determining an outputted page quantity message corresponding to the first job type according to the page quantity increment message and the initial outputted page quantity message corresponding to the first job type; or determining an outputted page quantity message corresponding to the first job type according to the page quantity increment message and the associated message of the initial outputted page quantity message corresponding to the first job type.

5. The method applied to an information processing apparatus according to claim 4, wherein obtaining the initial outputted page quantity message or the associated message of the initial outputted page quantity message corresponding to the first job type includes:

obtaining the initial outputted page quantity message or the associated message of the initial outputted page quantity message corresponding to the first job type from a first preset storage device, wherein the first preset storage device is configured in information processing apparatus associated with the consumable or an external device connected to the information processing apparatus.

6. The method applied to an information processing apparatus according to claim 3, wherein determining the first consumption messages of the recording material respectively corresponding to the n job types respectively according to the first consumption increment message received and the page quantity increment message includes:

determining a first job type corresponding to the page quantity increment message according to the page quantity increment message received;

obtaining an initial first consumption message of the recording material corresponding to the first job type or an associated message corresponding to the initial first consumption message; and determining a first consumption message of the recording material corresponding to the first job type according to the first consumption increment message and the initial first consumption message corresponding to the first job type; or determining a first consumption message of the recording material corresponding to the first job type according to the first consumption increment message and the associated message of the initial first consumption message corresponding to the first job type; wherein obtaining the initial first consumption message of the recording material corresponding to the first job type or the associated message corresponding to the initial first consumption message includes:

obtaining initial first consumption messages respectively corresponding to the n job types or associated messages corresponding to the initial first consumption messages of the recording material respectively corresponding to the n job types from a second preset storage device, wherein the second preset storage device is configured in information processing apparatus associated with the consumable or an external device connected to the information processing apparatus.

7. The method applied to an information processing apparatus according to claim 3, wherein determining the outputted page quantity messages respectively corresponding to the n job types according to the page quantity increment message received includes:

determining a first job type corresponding to the page quantity increment message according to the page quantity increment message received; obtaining an associated message of an initial outputted page quantity message corresponding to the first job type; according to a preset first algorithm, converting the associated message of the initial outputted page quantity message corresponding to the first job type into the initial outputted page quantity message; and according to the page quantity increment message, updating the initial outputted page quantity message converted to obtain an outputted page quantity message corresponding to the first job type; or determining a first job type corresponding to the page quantity increment message according to the page quantity increment message received; obtaining an associated message of an initial outputted page quantity message corresponding to the first job type; according to a preset second algorithm, converting the page quantity increment message received into an associated message corresponding to the page quantity increment message; according to the associated message corresponding to the page quantity increment message, updating the associated message of the initial outputted page quantity message corresponding to the first job type to obtain an associated message of the outputted page quantity message corresponding to the first job type; and obtaining an outputted page quantity message corresponding to the first job type according to the associated message of the outputted page quantity message corresponding to the first job type.

8. The method applied to an information processing apparatus according to claim 3, wherein determining the first consumption messages of the recording material respectively corresponding to the n job types respectively according to the first consumption increment message received and the page quantity increment message includes:

determining a first job type corresponding to the page quantity increment message according to the page quantity increment message received; obtaining an associated message of an initial first consumption message corresponding to the first job type; according to a preset third algorithm, converting the associated message of the initial first consumption message corresponding to the first job type into an initial first consumption messages; and according to the first consumption increment message, updating the initial first consumption messages converted to obtain a first consumption message of the recording material corresponding to the first job type; or determining a first job type corresponding to the page quantity increment message according to the page quantity increment message received; obtaining an associated message of an initial first consumption message of the recording material corresponding to the first job type; according to a preset fourth algorithm, converting the first consumption increment message corresponding to current output job received into an associated message corresponding to the first consumption increment message; according to the associated message corresponding to the first consumption increment message, updating the associated message of the initial first consumption message of the recording material corresponding to the first job type to obtain an associated message of a first consumption message of the recording material corresponding to the first job type; and obtaining a first consumption message corresponding to the first job type according to the associated message of the first consumption message.

9. An information processing apparatus, comprising:

a first sending module, configured to send outputted page quantity messages respectively corresponding to n job types and first consumption messages of the recording material respectively corresponding to the n job types to the image-forming apparatus, wherein:

the outputted page quantity messages are the cumulative outputted page quantity messages respectively corresponding to the n job types updated after current job output is completed;

the first consumption messages are configured to determine the consumption amount message of the recording material consumed by the outputted page quantity of corresponding job types; and the outputted page quantity messages respectively corresponding to the n job types and the first consumption messages of the recording material respectively corresponding to the n job types are configured to determine a total consumption message of the recording material in a consumable; n is an integer greater than 1; single-job outputted page quantities respectively corresponding to the n job types are different; and the n job types are categorized based on number of pages outputted single job.

10. The information processing apparatus according to claim 9, wherein:

the outputted page quantity messages respectively corresponding to the n job types and/or the first consumption messages of the recording material respectively corresponding to the n job types are further configured to determine whether the consumable meets expectation.

11. The information processing apparatus according to claim 9, further including:

a first receiving module, configured to receive a page quantity increment message corresponding to current output job and a first consumption increment message of the recording material corresponding to current output job sent by the image-forming apparatus;

a page quantity updating module, configured to determine the outputted page quantity messages respectively corresponding to the n job types according to the page quantity increment message received; and a consumption message updating module, configured to determine the first consumption messages of the recording material respectively corresponding to the n job types respectively according to the first consumption increment message received.

12. The information processing apparatus according to claim 11, wherein the page quantity updating module is configured to:

determine a first job type corresponding to the page quantity increment message according to the page quantity increment message received;

obtain an initial outputted page quantity message or an associated message of the initial outputted page quantity message corresponding to the first job type; and determine an outputted page quantity message corresponding to the first job type according to the page quantity increment message and the initial outputted page quantity message corresponding to the first job type; or determine an outputted page quantity message corresponding to the first job type according to the page quantity increment message and the associated message of the initial outputted page quantity message corresponding to the first job type.

13. The information processing apparatus according to claim 12, wherein the page quantity updating module is configured to:

obtain the initial outputted page quantity message or the associated message of the initial outputted page quantity message corresponding to the first job type from a first preset storage device, wherein the first preset storage device is configured in information processing apparatus associated with the consumable or an external device connected to the information processing apparatus.

14. The information processing apparatus according to claim 11, wherein the consumption message updating module is configured to:

determine a first job type corresponding to the page quantity increment message according to the page quantity increment message received; obtain an initial first consumption message of the recording material corresponding to the first job type or an associated message corresponding to the initial first consumption message; and determine a first consumption message of the recording material corresponding to the first job type according to the first consumption increment message and the initial first consumption message corresponding to the first job type; or determine a first consumption message of the recording material corresponding to the first job type according to the first consumption increment message and the associated message of the initial first consumption message corresponding to the first job type; or obtain initial first consumption messages respectively corresponding to the n job types or associated messages corresponding to the initial first consumption messages of the recording material respectively corresponding to the n job types from a second preset storage device, wherein the second preset storage device is configured in information processing apparatus associated with the consumable or an external device connected to the information processing apparatus.

15. The information processing apparatus according to claim 11, wherein the page quantity updating module is configured to:

determine a first job type corresponding to the page quantity increment message according to the page quantity increment message received; obtain an associated message of an initial outputted page quantity message corresponding to the first job type; according to a preset first algorithm, convert the associated message of the initial outputted page quantity message corresponding to the first job type into the initial outputted page quantity message; and according to the page quantity increment message, update the initial outputted page quantity message converted to obtain an outputted page quantity message corresponding to the first job type; or determine a first job type corresponding to the page quantity increment message according to the page quantity increment message received; obtain an associated message of an initial outputted page quantity message corresponding to the first job type; according to a preset second algorithm, convert the page quantity increment message received into an associated message corresponding to the page quantity increment message; according to the associated message corresponding to the page quantity increment message, update the associated message of the initial outputted page quantity message corresponding to the first job type to obtain an associated message of the outputted page quantity message corresponding to the first job type; and obtain an outputted page quantity message corresponding to the first job type according to the associated message of the outputted page quantity message corresponding to the first job type.

16. The information processing apparatus according to claim 11, wherein the consumption message updating module is configured to:

determine a first job type corresponding to the page quantity increment message according to the page quantity increment message received; obtain an associated message of an initial first consumption message corresponding to the first job type; according to a preset third algorithm, convert the associated message of the initial first consumption message corresponding to the first job type into an initial first consumption messages; and according to the first consumption increment message, update the initial first consumption messages converted to obtain a first consumption message of the recording material corresponding to the first job type; or determine a first job type corresponding to the page quantity increment message according to the page quantity increment message received; obtain an associated message of an initial first consumption message of the recording material corresponding to the first job type; according to a preset fourth algorithm, convert the first consumption increment message corresponding to current output job received into an associated message corresponding to the first consumption increment message; according to the associated message corresponding to the first consumption increment message, update the associated message of the initial first consumption message of the recording material corresponding to the first job type to obtain an associated message of a first consumption message of the recording material corresponding to the first job type; and obtain a first consumption message corresponding to the first job type according to the associated message of the first consumption message.

17. A consumable, comprising:

a housing;

a developer accommodating portion in the housing and configured to accommodate a developer; and the information processing apparatus according to claim 9.

18. The consumable according to claim 17, further including:

a developer conveying unit, configured to convey the developer.

19. The consumable according to claim 18, further including:

a photosensitive drum; and a developing roller, configured to charge the photosensitive drum.

20. A consumable, comprising:

a photosensitive drum;

a developing roller, configured to charge the photosensitive drum; and the information processing apparatus according to claim 9.

* * * * *